US007228528B2

(12) United States Patent
Wang et al.

(10) Patent No.: US 7,228,528 B2
(45) Date of Patent: Jun. 5, 2007

(54) BUILDING INTER-BLOCK STREAMS FROM A DYNAMIC EXECUTION TRACE FOR A PROGRAM

(75) Inventors: Hong Wang, Fremont, CA (US); Marsha Eng, Santa Clara, CA (US); Perry Wang, San Jose, CA (US); John P. Shen, San Jose, CA (US); Gerolf F. Hoflehner, Santa Clara, CA (US); Daniel Lavery, Santa Clara, CA (US); Wei Li, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 10/609,246

(22) Filed: Jun. 26, 2003

(65) Prior Publication Data

US 2004/0268333 A1    Dec. 30, 2004

(51) Int. Cl.
*G06F 9/45*     (2006.01)
*G06F 15/00*    (2006.01)
(52) U.S. Cl. .................. 717/131; 717/153; 717/154; 712/231; 712/233

(58) Field of Classification Search ......... 717/124–161
See application file for complete search history.

(56) References Cited

U.S. PATENT DOCUMENTS

| 5,179,702 | A  * | 1/1993 | Spix et al. .................. 718/102 |
| 5,517,628 | A  * | 5/1996 | Morrison et al. ........... 712/234 |
| 5,627,994 | A  * | 5/1997 | Levy et al. ................. 711/150 |
| 5,933,626 | A  * | 8/1999 | Mahalingaiah et al. ..... 712/227 |
| 6,076,144 | A  * | 6/2000 | Peled et al. ................. 711/125 |
| 6,594,773 | B1 * | 7/2003 | Lisitsa et al. ............... 713/600 |
| 6,941,545 | B1 * | 9/2005 | Reese et al. ................ 717/130 |

* cited by examiner

*Primary Examiner*—Chuck Kendall
(74) *Attorney, Agent, or Firm*—Blakely, Sokoloff, Taylor & Zafman LLP

(57) ABSTRACT

In one embodiment, the invention provides a method for the processing of instructions. A method which comprises analyzing a dynamic execution trace for a program; identifying at least one stream comprising a plurality of basic blocks in the dynamic execution trace; collecting metrics associated with the at least one stream; and optimizing the at least one stream based on the metrics.

25 Claims, 23 Drawing Sheets

Stream Dictionary — 300

| start ip | end ip | ip for next stream |
|----------|--------|--------------------|
| A | A+8 | |
| A | A+16 | |
| B | B+24 | |
| | | |
| | | |
| | | |
| | | |
| | | |
| | | |

FIGURE 20

Stream Dictionary — 302

| start ip | end ip | ip for next steam1 | ip for next stream 2 |
|----------|--------|--------------------|-----------------------|
| | | | |
| | | | |
| | | | |
| | | | |
| | | | |
| | | | |
| | | | |
| | | | |
| | | | |
| | | | |
| | | | |

FIGURE 21

STREAM PREDICTOR TABLE

400

| INPUT STREAM/BLOCK | | TARGET STREAM/BLOCK | | stream/normal | confidence |
|---|---|---|---|---|---|
| start ip | end ip | start ip | end ip | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |

BUILDING INTER-BLOCK STREAMS FROM A DYNAMIC EXECUTION TRACE FOR A PROGRAM

FIELD OF THE INVENTION

This invention relates to the processing of instructions. In particular it relates to code optimization when processing instructions in a microprocessor.

BACKGROUND

Broadly, the function of a compiler is to compile a source program written in a high level language into a target program for a given instruction set architecture (ISA), which is understood by a machine in which the compiled program is executed.

In order to increase computational throughput, a compiler may perform transformations in order to optimize the speed at which the compiled program can be executed.

The output of the compiler, i.e., the compiled code will be referred to hereinafter as "macroinstructions." This is in contrast to microinstructions, which refers to the machine implementation-specific internal representation of instructions for a given ISA. Generally, these microinstructions are not visible to a compiler. A given macroinstruction may have several microinstructions, each of which is machine implementation-specific.

Since a particular microinstruction will typically only execute correctly on a machine that understands the microinstruction, a natural limit to how much optimization a compiler does is imposed by the requirement that in general, the macroinstructions produced by a compiler should be able to execute on all machines that support a given ISA, regardless of what microinstructions correspond to the macroinstructions.

If the microinstructions corresponding to each macroinstruction in an ISA is known, a compiler may be able to optimize the code even further by producing a machine implementation-specific microinstructions.

However, in such a case, because the microinstructions are machine implementation-specific, the microinstructions will no longer operate on other machines that share the same ISA, but have different microinstructions corresponding to the macroinstructions in the ISA.

BRIEF DESCRIPTION OF THE DRAWINGS

FIGS. 20–21 show examples of a stream dictionary generated by the hardware of FIG. 19;

FIG. 23 shows an example of a stream predictor table created by the hardware of FIG. 19.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
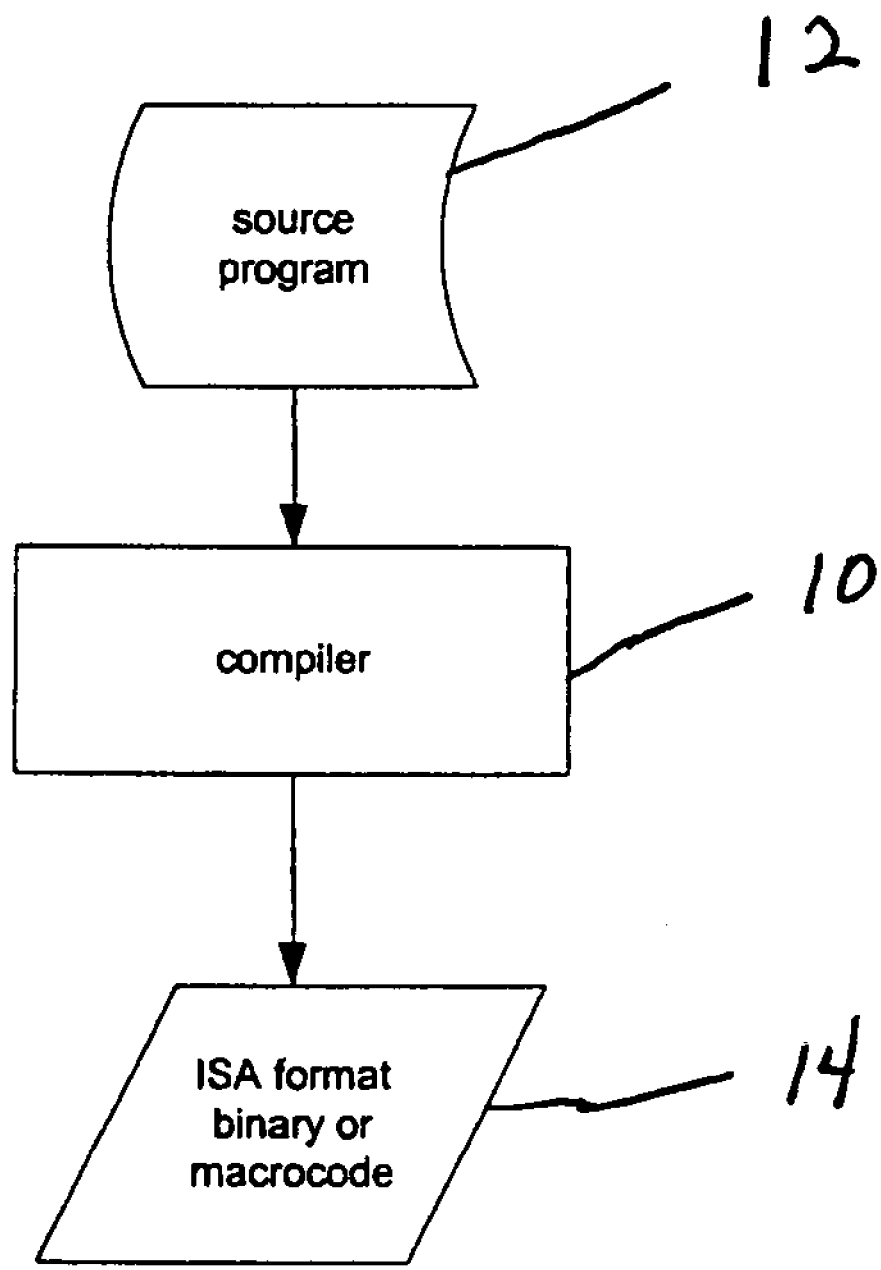
FIG. 1 schematically illustrates the conversion of a source program into an ISA format binary or macrocode comprising microinstructions in accordance with the prior art.

FIG. 1 of the drawings illustrates the operation of a compiler 10 in accordance with the prior art. Referring to FIG. 1, it will be seen that the compiler 10 converts a source program 12 written in a high level language into macroinstructions 14 which are compatible with the ISA definition of a target machine on which the macroinstructions are to be executed. The macroinstructions 14 can, generally, execute on any machine that supports the ISA definition for which it was compiled.

In producing the macroinstructions 14, the compiler 10 usually performs one or more code optimizations which allows the macroinstructions 14 to execute faster on the target machine.

In general, the macroinstructions 14 comprise complex instructions which are converted into simple instructions which are then executed on the target machine. These simple instructions are known as microinstructions. Microinstructions are highly ISA implementation-specific. Thus, a given instruction written for one ISA translates into different microinstructions on different machine implementations of the ISA.

Since macroinstructions 14 include complex instructions, in contrast to microinstructions which are simple. If the compiler 10 converts the source program 12 into microinstructions, then these microinstructions execute more efficiently or rapidly than the macroinstructions 14. This is because microinstructions are directly executable, whereas macroinstructions have to be converted to microinstructions prior to execution. However, since microinstructions are highly machine implementation-specific, microinstructions for one machine implementation of an ISA may not be able to execute on a different machine implementation of an ISA.

This is undesirable since a general goal of all compiled programs is that they should execute on all machine-implementations that support a given ISA.

Thus, compilers, in general, stop short of optimizing code to the level of introducing machine implementation-specific microinstructions into a compiled program.

According to aspects of embodiments of the present invention, an intermediate code format is produced between the macroinstructions 14 and the machine implementation-specific microinstructions. In one embodiment, the intermediate code format includes a hybrid of macroinstructions and microinstructions. During execution of the intermediate code, if a machine implementation understands the microinstructions, then the microinstructions are executed; otherwise, the macroinstructions are executed. Since, the intermediate code format of an embodiment of the present invention includes macroinstructions, the code is able to execute simultaneously on all machine implementations for a given ISA. One advantage of the techniques disclosed below is that they provide a code format that includes microinstructions which may be executed more rapidly or efficiently on a target machine that understands these microinstructions, while at the same time including macroinstructions which may be executed by a machine that does not understand the microinstructions.

Figure 2:
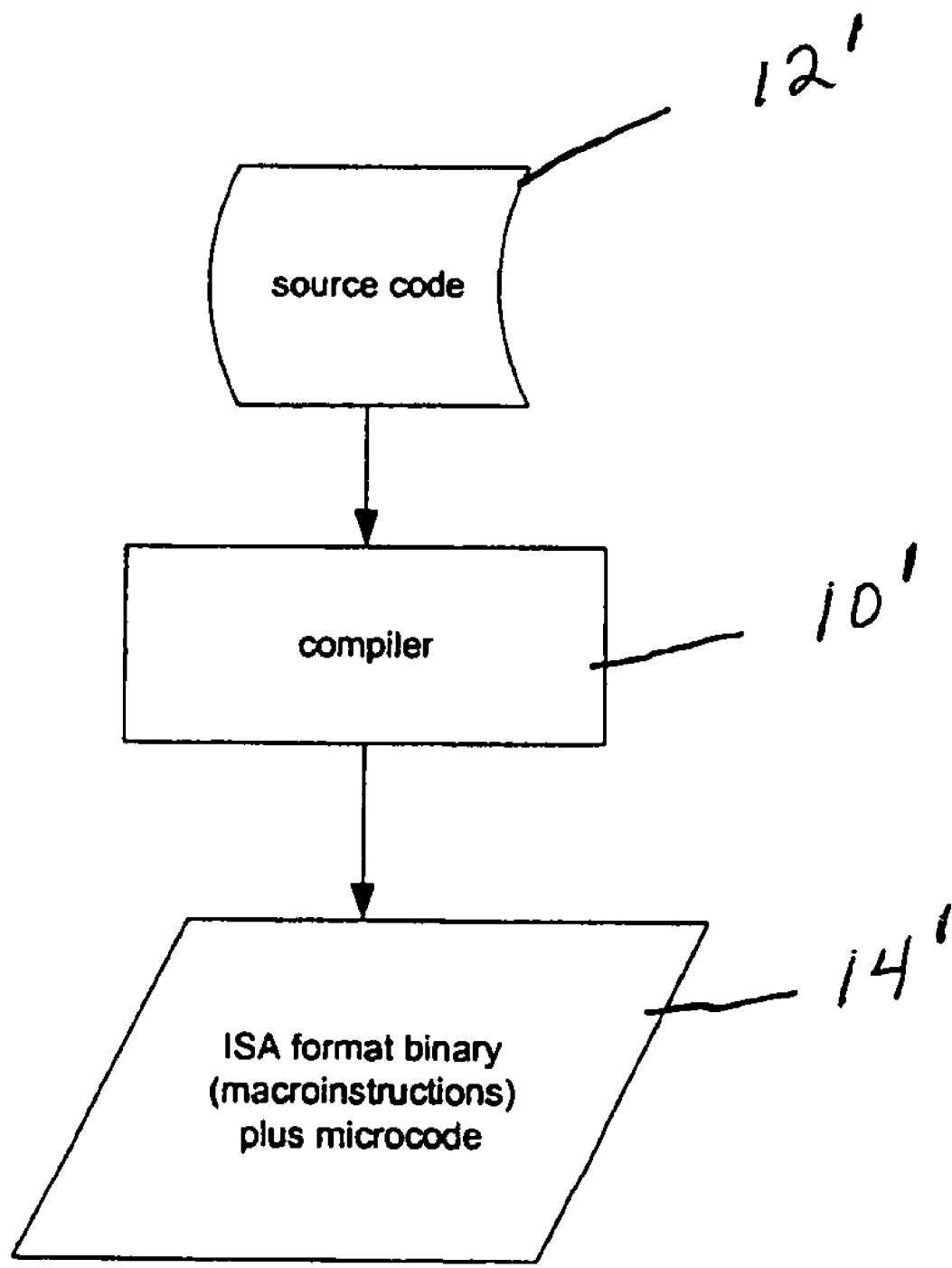
FIG. 2 schematically illustrates the conversion of a source program into intermediate form code by a compiler, in accordance with one embodiment of the invention.

FIG. 2 of the drawings illustrates the operation of a compiler 10' in accordance with one embodiment of the invention. As will be seen, the compiler 10' receives as its input, a source program 12' which it converts to an intermediate code format 14' which includes ISA instructions or macroinstructions, as well as machine implementation-specific code or microinstructions.

In another embodiment, the compiler 10' produces binary code which includes ISA instructions (macroinstructions) as well as an alternative representation of the microinstructions.

Figures 3, 4:
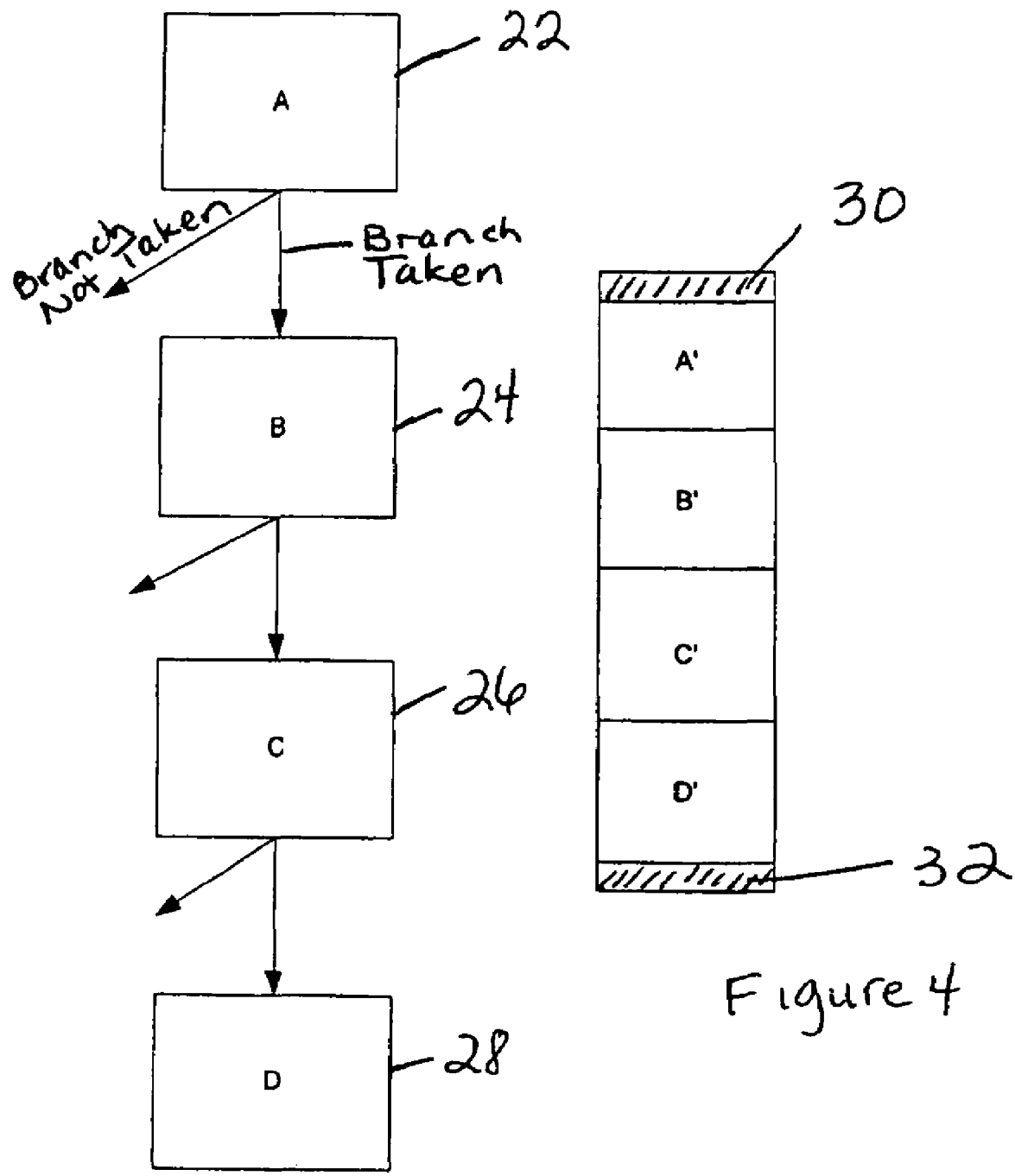
FIG. 3 illustrates a program or a section of a program comprising blocks of macroinstructions.
FIG. 4 illustrates one example of an alternative representation of ISA microinstructions for the macroinstructions of FIG. 3 in accordance with one embodiment of the invention.

FIGS. 3 and 4 of the drawings illustrate one example of how the alternative representation of the ISA macroinstructions may be constructed. Referring to FIG. 3, a program or a section of a program is shown to comprise code blocks 22 to 28. At the end of each code block 22 to 28, there is a conditional or branch instruction which causes program execution to branch along the arrows designated branch not taken, or branch taken, as the case may be.

During execution of basic blocks 22 to 28, it may turn out that there is a high probability that the basic blocks 22 to 28 actually get executed. In other words the branches between basic blocks 22, 24, 26 and 28 actually get taken.

Figure 5:
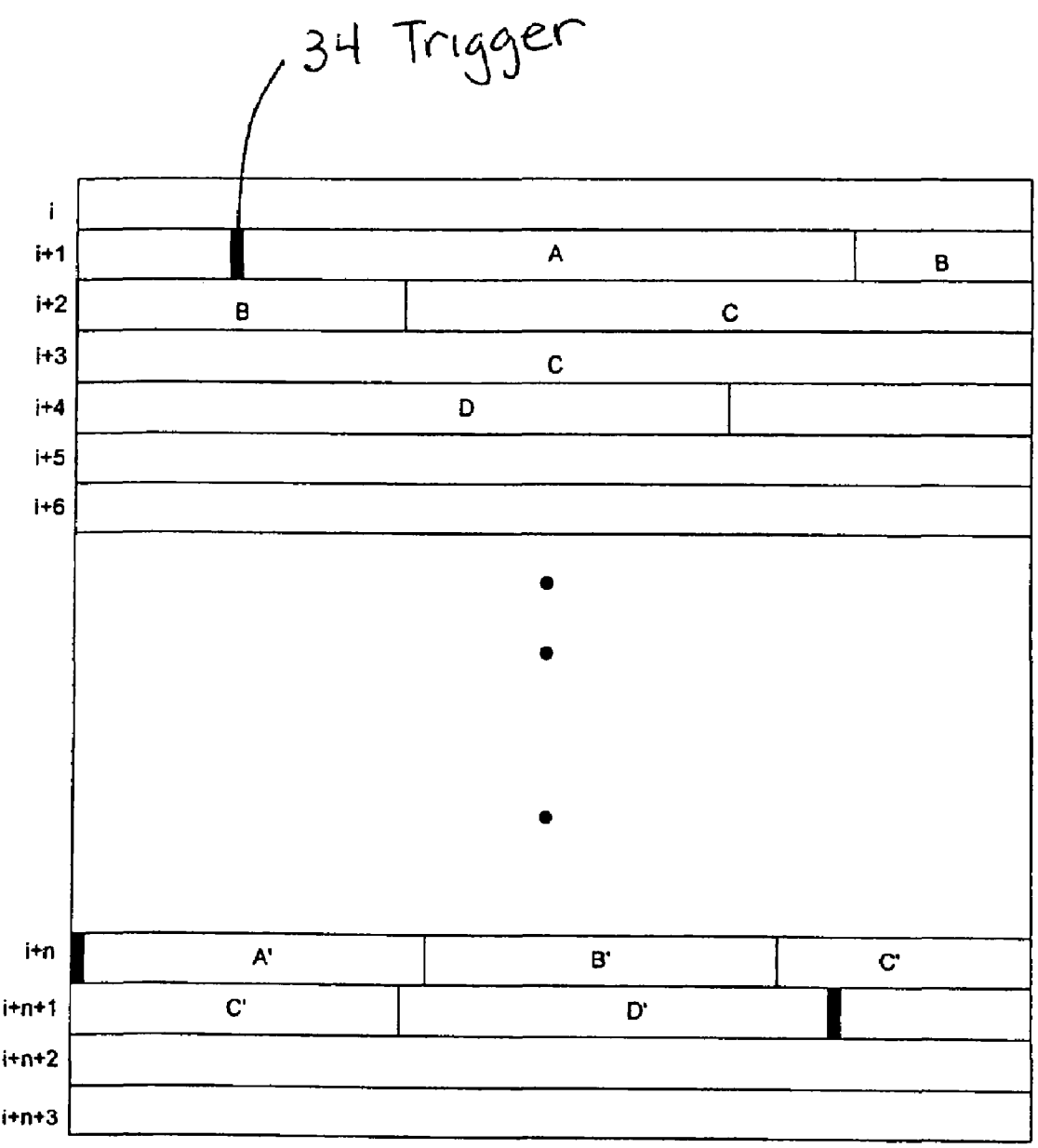
FIG. 5 schematically illustrates how the mesocode may be used to decrease cache latency in one embodiment of the invention.

However, the basic blocks 22 to 28 may reside on four separate cache lines as indicated in FIG. 5 of the drawings.

Since basic blocks 22 to 28 have a high probability of being executed, an alternative representation of the blocks may include packing these blocks together to define basic blocks 22' to 28', as is illustrated in FIG. 4 of the drawings. The blocks 22' to 28' take up only two cache lines viz. i+n, and i+n+1 as can be seen in FIG. 5 of the drawings. Since execution of blocks 22' to 28' only requires two cache accesses instead of the four cache accesses required in order to execute blocks 22 to 28, it will be appreciated that execution of the alternative representation 22' to 28' will be faster.

For ease of reference, the alternative representation code 22' to 28' will be referred to "mesocode." In some embodiments, the mesocode is encapsulated by the boundary markers designated by reference numerals 30 and 32 as will be seen in FIG. 4 of the drawings.

Execution of the mesocode is triggered whenever a trigger is encountered in the original code. Thus, aspects of embodiments of the present invention involve embedding a trigger in the original code, e.g., trigger 34 shown in FIG. 5 of the drawings.

In other embodiments, an explicit trigger is not encoded in the original code, since the start boundary marker 30 may be used as a trigger.

The boundary markers 30, 32, and the trigger 34 may be in the format of the ISA for which the code was compiled.

In one embodiment, the boundary markers 30, 32, and the trigger 34 are defined using unused templates for a given ISA architecture, e.g., the Itanium ISA. To achieve this, the mesocoded region may be bounded by instruction syllables or micro ops that are not narrowed by any other ISA templates. The microcoded regions may be kept separate as appendices to the original code and are thus unobtrusive to the original code. In another embodiment, the microcode may redundantly express frequently executed portions of the original code, encoded in a different, more efficient format.

Explicitly Parallel Instruction Computing (EPIC) ISA's, including the Itanium ISA use template carrying bundles as atomic units that are fetched and executed. Templates make it possible to decipher other types of instructions in a bundle well before the instructions are decoded. Individual instructions inside a bundle act more like micro ops and will be referred to as such to avoid confusion. Stop bits are used to express parallelism (for instructions between stop bits) and data dependency (for instructions across stop bits) behavior. The Itanium ISA also includes predication and static branch hints on the micro op level, which in conjunction with the stop bits and templates, could be used to express program behavior and granularity beyond the traditional basic block level.

The problem with forcing micro ops into fixed issue templates is that no ops (NOPs) are introduced into the code when no usable instructions can be found to fill out the rest of a template. These NOPs dilute code density and degrade cache pipeline utilization by taking up valuable space and pipeline resources that could be filled with useful instructions.

The effective fetch bandwidth is reduced due to the effects of these wasteful instructions. Predication can have the same effect in that instructions that are predicated false at runtime effectively become NOPs in the dynamic code stream, which occupy these sources and degrade the instructions per cycle (IPC). Another problem with using fixed issue templates is that branch targets are required to be bundle aligned. This can introduce cache line fragmentation when the cache line is bigger than a bundle. When a taken branch or a branch target is not aligned to the cache line, then the rest of the cache line will be wasted, which reduces effective usage of the fetch bandwidth. These problems of code density dilution may be solved by an introduction of a mesocoded region in the compiled code, which in one embodiment may represent compacted code with the wasteful NOPs and predicated false instructions removed.

Figure 6:
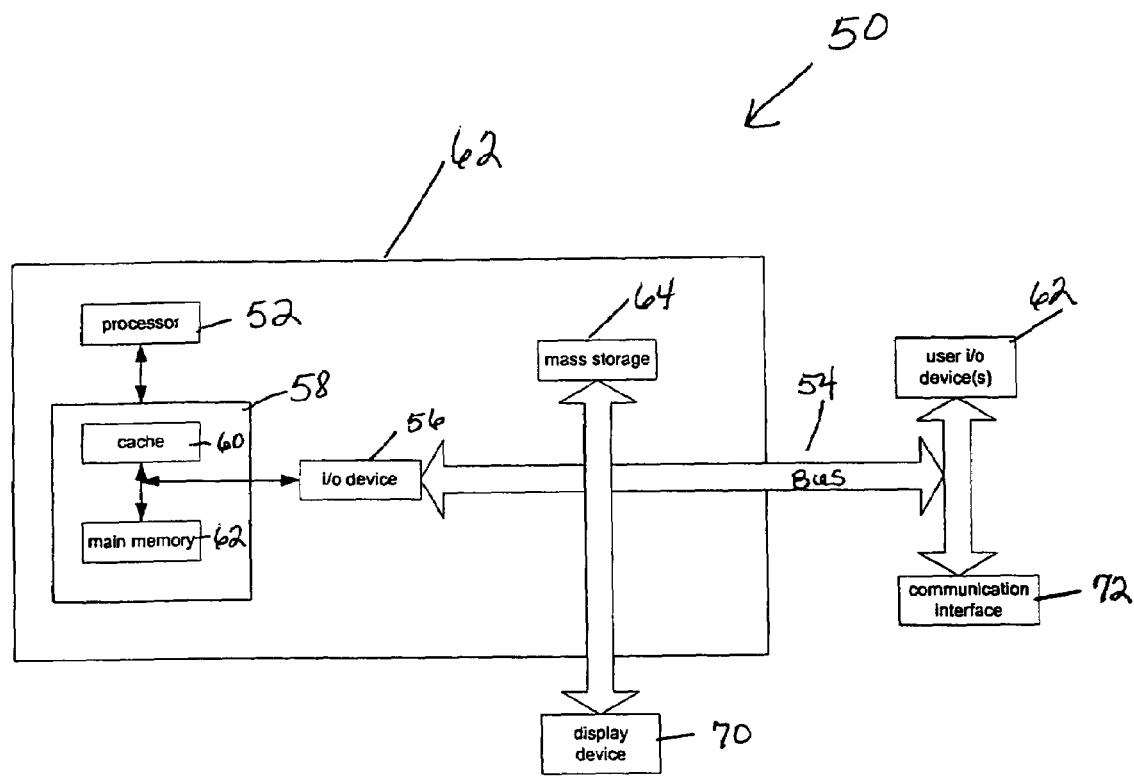
FIG. 6 shows a schematic drawing of a computer system in accordance with one embodiment of the invention.

FIG. 6 shows a typical general purpose computer system 50 including a processor 52 in accordance with one embodiment of the present invention. The computer system 50 in accordance with one embodiment of the present invention comprises an address/data bus 54 for communicating information. The processor 52 is coupled via the bus 54 to Input/Output (I/O) device 56 for processing data and executing instructions. A memory system 58 is coupled with bus 54 for storing information and instructions for the processor 52. The memory system 58 comprises, for example, cache memory 60 and main memory 62. Cache memory 60 includes one or more levels of cache memory. In a typical embodiment, the processor 52, the I/O device 56, and some or all of the cache memory 60, may be integrated in a single integrated circuit.

User I/O devices 62 are coupled to the 54 and are operative to communicate information in appropriately structured form to and from the other parts of the computer 50. The user I/O devices 62 may include a keyboard, mouse, card reader, magnetic or paper tape, magnetic disk, optical disk, or other available input devices, including another computer.

A mass storage device 64 is coupled to bus 54 and may be implemented using one or more magnetic hard disks, magnetic tapes, CDROMs, large banks of random access memory, or the like. A wide variety of random access, and read only memory technologies are available and are equivalent for purposes of the present invention. The mass storage 64 may include computer programs and data stored therein. Some or all of the mass storage 64 may be configured to be incorporated as part of the memory system 58.

In a typical computer system 50, the processor 52, the I/O device 56, the memory system 58, and the mass storage device 64, are coupled to the bus 54 formed on a printed circuit board and integrated into single housing. However, in the particular components chosen to be integrated into a single housing is based upon market and design choices. Accordingly, it is expressly understood that fewer or more devices may be incorporated within the housing suggested by dashed line 68.

A display device 70 is used to display messages, data, a graphical or command line user interface, or other communications with a user. The display 70 may be implemented, for example, by Cathode Ray Tube (CRT) monitor, Liquid Crystal Display (LCD), or any available equivalent. A communication interface 72 provides communications capability to other devices.

Figure 7:
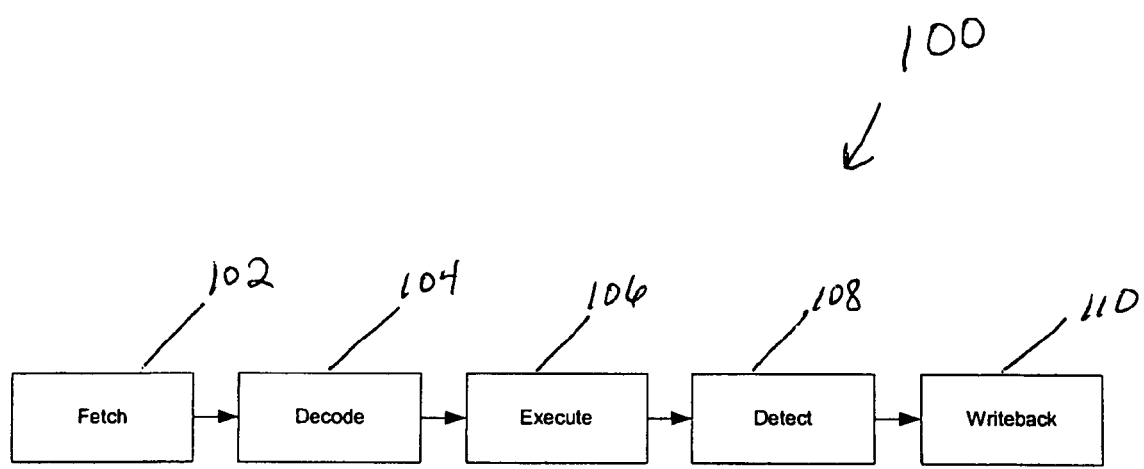
FIGS. 7 to 9 schematically illustrate a pipeline implemented in the computer system of FIG. 6.

Referring now to FIG. 7 of the drawings, reference numeral 100 generally indicates the stages of a processor pipeline implemented within the processor 52. The stages of the pipeline 100 includes a fetch stage 102, a decode stage 104, an execute stage 106, an error detect stage 108, and a write back stage 110. Each stage executes in a single clock cycle. The above stages are the stages implemented in one embodiment which is described in greater detail. In other embodiments, the number or the name of the stages may vary. Furthermore, in one embodiment the architecture is a superscalar architecture. Thus, each stage may be able to process two or more instructions simultaneously. In the preferred embodiment, two parallel paths are provided for each stage so that there is a dual fetch stage, a dual decode stage, a dual execution stage, a dual error detect stage, and a write back stage. In other embodiments, more than two parallel paths may be provided for each stage.

For ease of description, the following description assumes a single pipeline. The pipeline stages 102 to 110 in FIG. 7 of the drawings are conventional stages performed within a conventional pipeline. Thus, these stages and the hardware necessary to implement them are not described in detail. However, the decode stage 104 provides the processor 52 with two modes of operation. In the first mode of operation, a decoder which executes the decode stage 104 encounters a start template in the instruction stream, which in some embodiments, may be the trigger 34 or the boundary marker 30. Once the start template is encountered, the processor switches to a second mode of operation in which a special mesocode decoder is used to process the microcode ops. When the mesocode decoder encounters the end template it switches back to the standard decode mechanism. The fetch mechanism is changed to recognize the new escape templates and fetches instructions continuously until it reaches the end of the mesocoded region. The instruction issue for the mesocode region does not have to check for templates because it is non-existent in mesocode encoding. Within the mesocoded region, the microcode may be scheduled in such a way that the instruction issue does not have to check for data dependencies and can simply issue the instructions. Since this instruction issue is different from the original ISA, the instruction issue for the mesocoded region and for the signal ISA essentially work in parallel with each other. Thus, the mesocode and the original code can coexist without impacting each other.

Figure 8:
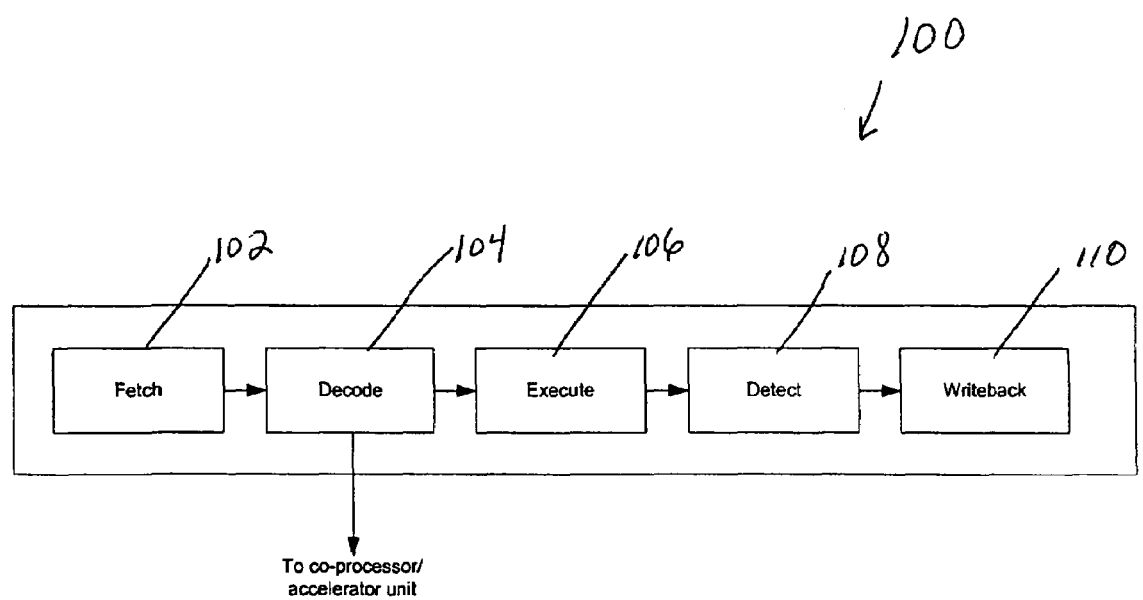

As noted above, the mesocoded regions may include machine implementation specific microinstructions, alternative non-microcode encodings, e.g., of frequently executed code, and the like. In another embodiment, the mesocoded region may include instructions of a different ISA definition. For example, in one embodiment the mesocoded region may include instructions in the format of the ISA of a coprocessor or an accelerator unit. In this embodiment, when the decoder for decode stage 104 detects the mesocoded region it automatically routes the mesocoded instructions to the co-processor/accelerator unit as is illustrated in FIG. 8 of the drawings.

Figure 9:
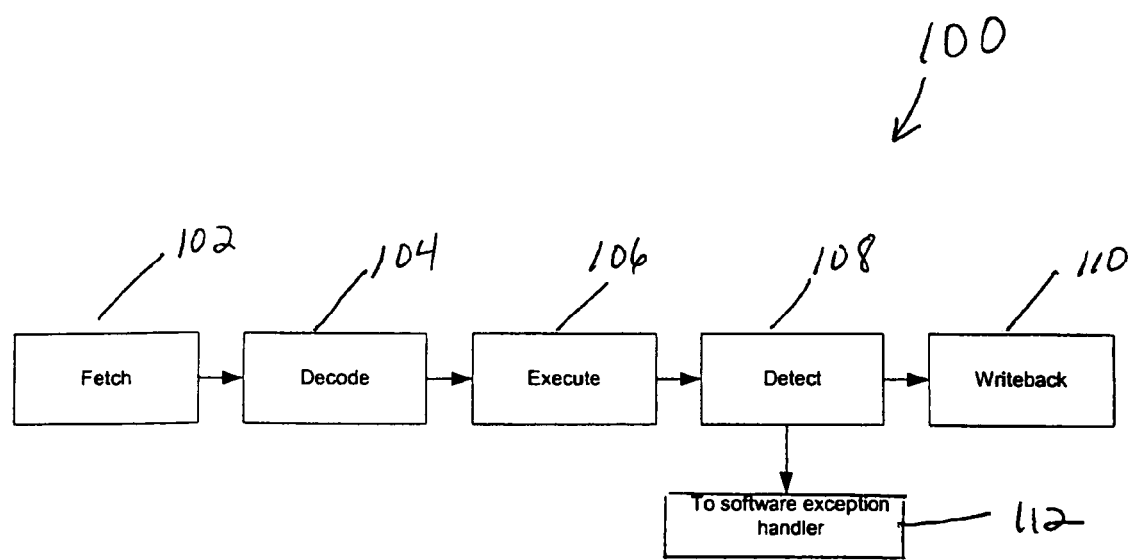

In some cases, the mesocoded regions may include other types of coding, e.g., byte code for a Java Virtual Machine. In this case, in the error detection stage 108 an exception is thrown to a software handler 112 which then processes the byte code. This is illustrated in FIG. 9 of the drawings.

According to a further aspect of one embodiment of the present invention, a program is characterized in terms of streams that comprise basic blocks to be encoded as mesocode. Each basic block includes a sequence of instructions that start at a taken branch target and end at a branch taken instruction. In one embodiment, characterizing a program in terms of streams involves three general operations. The first operation involves partitioning a global instruction execution trace into smaller or local instruction execution traces and determining the stream boundaries within each local instruction execution trace. The second operation creates a local dictionary of unique streams seen during program execution in each local instruction trace and correlates the unique streams back to the global execution instruction trace. Finally, the third operation creates a global stream dictionary that is valid for all portions of the global instruction trace, and re-labels the local instruction execution traces to reflect entries in the global stream dictionary.

Effectively, this methodology transforms traces of dynamic instructions into streams of basic blocks. In one embodiment, all unique streams have entries in the global dictionary and each unique stream is mapped to a unique symbol. Through frequency and coverage (coverage is defined as the size of a stream times a frequency which take stream is executed) analysis, all entries in the dictionary are ranked in order of priority.

In one embodiment, a software tool such as an instruction-accurate simulator is used to execute the program and to provide details of each instruction that was executed. It is possible to classify each instruction according to a type. For example, in one embodiment, the following information about instruction types are collected by the software tool:
predicate true—taken branch;
predicate true—not taken branch;
predicate false—taken branch;

predicate false—not taken branch;
load instructions; and
store instructions.

The software tool may be used to concurrently determine the stream boundaries, which as noted above, end on taken branches and begin at a branch target. Each stream has associated with it, a start instruction pointer, an end instruction pointer, unique instruction counts, as well as the length in instructions, and a profile of how many instructions of each type were executed. The ordering of the streams corresponds to the program (global) instruction execution trace.

In one embodiment, because the above-described instruction-level analysis is time consuming, the program is divided into a number of smaller chunks or local traces, each comprising a fixed number of instructions. Thereafter, each of the local traces is analyzed in parallel. This approach requires a final merging step as described below. One advantage of dividing the program into local traces for parallel analysis is that computing resources may be used to improve the efficiency of the analysis.

Figure 10:
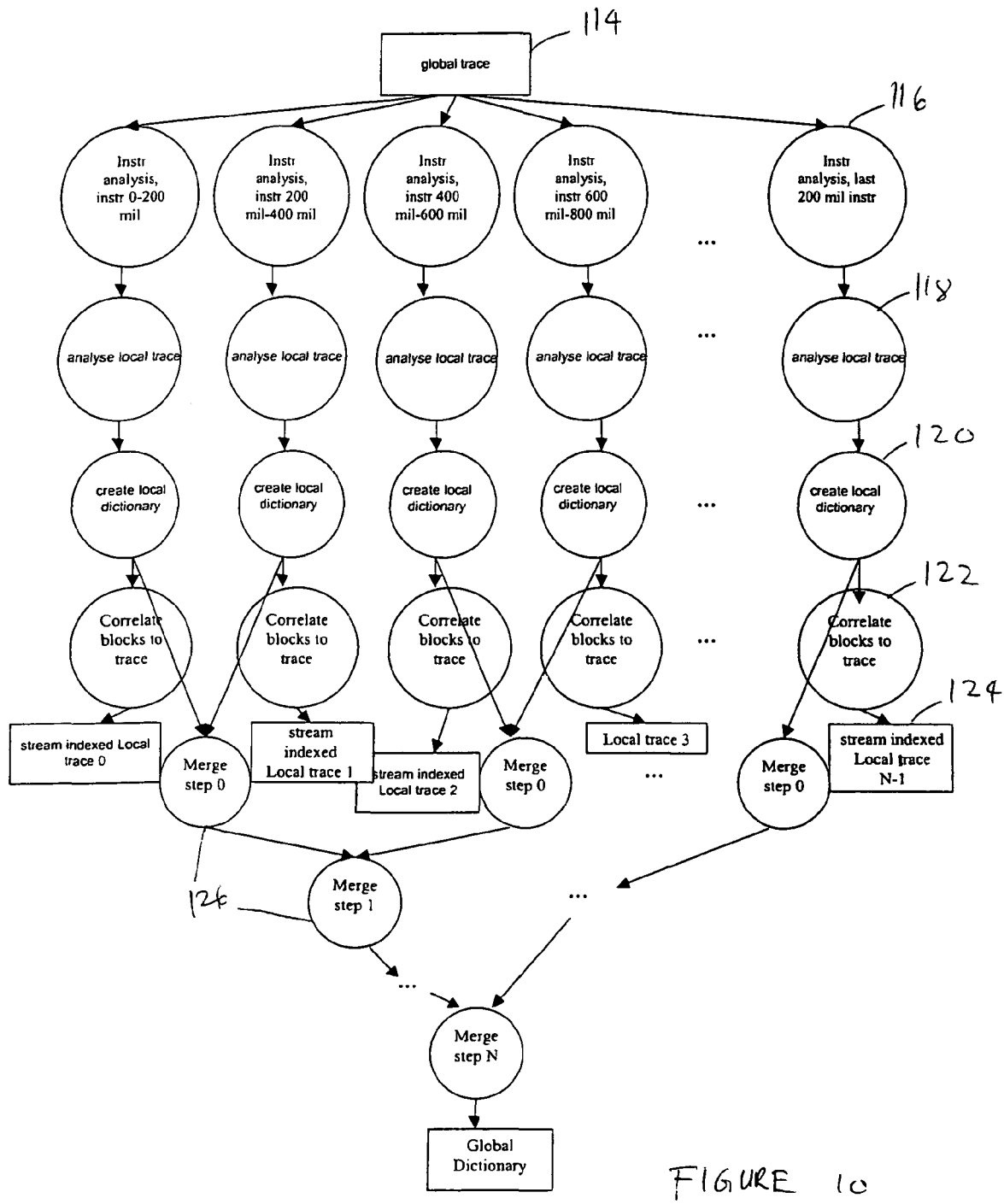
FIGS. 10–15, and 17–18, illustrate a software technique for identifying streams of basic blocks for mesocode encoding.

Once the analysis for each local trace is completed, the next operation involves grouping identical streams together and sorting them by their exit instruction pointer counts. Duplicate streams are removed and the frequencies of the remaining streams are updated. The resulting list contains only unique streams, and metrics about the streams such as the execution frequency of each stream. A unique identifier/symbol is associated with each stream. This operation is performed at a local trace level as described above and the result is a local stream dictionary that is then used to convert the raw local instruction trace to a stream trace. Thereafter, several merging operations are required to create a single global stream dictionary for the entire program. In one embodiment, each merging step takes two local stream dictionaries and removes duplicate streams, while keeping and updating the frequencies of the stream that occurred earliest in time. Additional sorting operations may be performed to identify streams, for example, with the highest frequency or coverage. FIG. 10 of the drawings illustrates the above-described process for identifying streams of basic blocks. Referring to FIG. 10, it will be seen that a global instruction trace 114 is initially partitioned into a number of local instruction traces 116. The number of instructions within each local instruction trace 116 may vary, however, in the example shown in FIG. 10, each local instruction trace 116 has 200 million instructions. Each local instruction trace 116 is analyzed at 118 to identify streams of basic blocks therein. At 120, a local stream dictionary is constructed for each local stream trace 116 in a manner described above. At 122, a correlation step is performed wherein each stream identified within a local trace is correlated back to the local trace to produce a stream indexed local trace 124. At 126, pairs of stream indexed local streams are merged in a sequence of (N) merging steps that ultimately produce the global stream dictionary 126. The global stream dictionary 128 may be additionally sorted by frequency, coverage, or some other metric.

Figure 11:
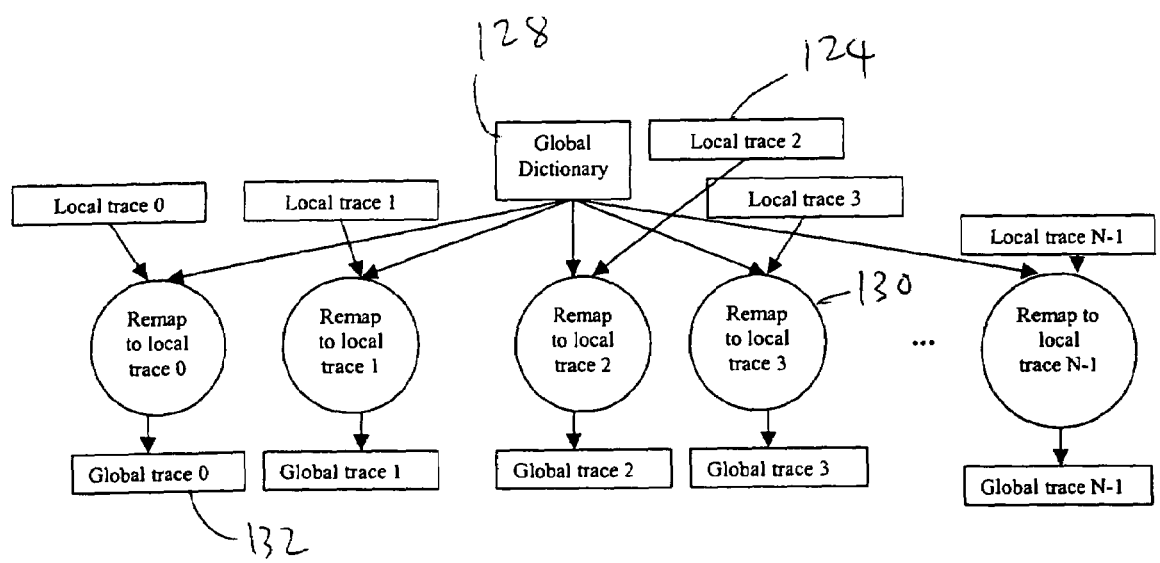

Once the global stream dictionary 128 is created, a remapping phase is performed to re-label the stream indexed local trace 124 with the unique symbols from the global dictionary 128. The remapping phase may be performed in parallel once the global dictionary 128 is created. The remapping process is illustrated in FIG. 11 of the drawings. Referring to FIG. 11, using the global stream dictionary 128, a remapping operation is performed at 130. Essentially, the remapping operation 130 uses each stream indexed local trace 124 to perform a look-up of the global stream dictionary 128 in order to remap each stream indexed local trace 124 to produce a corresponding stream indexed global trace 132.

Figure 12:
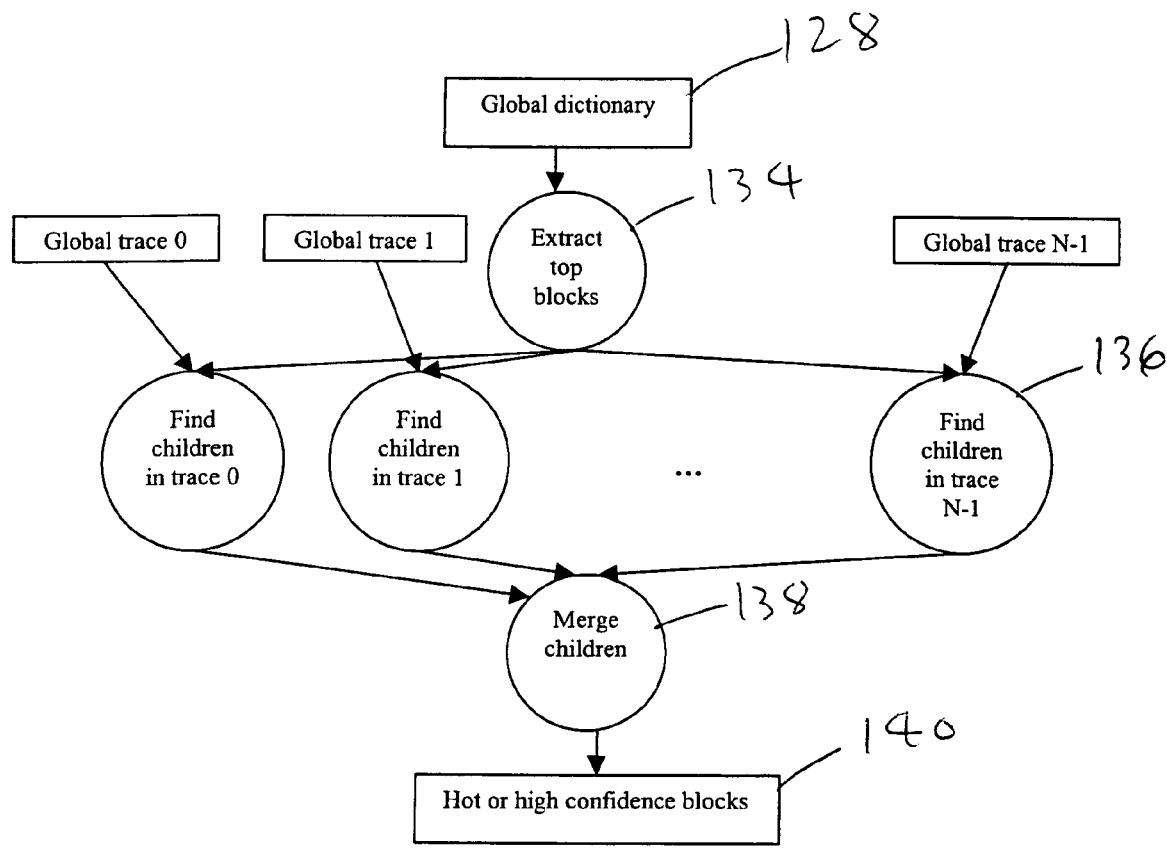

In one embodiment, once the streams have been identified, high confidence or "hot" streams are identified. These hot streams are frequently executed. The process of identifying hot streams is illustrated with reference to FIG. 12 of the drawings. Referring to FIG. 12, at a first pass 134, the hot streams are selected based on some number of top coverage or frequency streams. This number can be fixed or a percentage of all the unique streams in the program. In a second pass 136, the execution trace is scanned to identify high confidence children of these hot streams. A stream is a candidate if it is a child of a hot stream and not already a hot stream. Further, additional filtering criteria may be used. For example, a high confidence stream may be required to have a parent that ends in a predicted taken branch. At 138, the high confidence children are merged to produce a list of hot streams 140.

Figure 13:
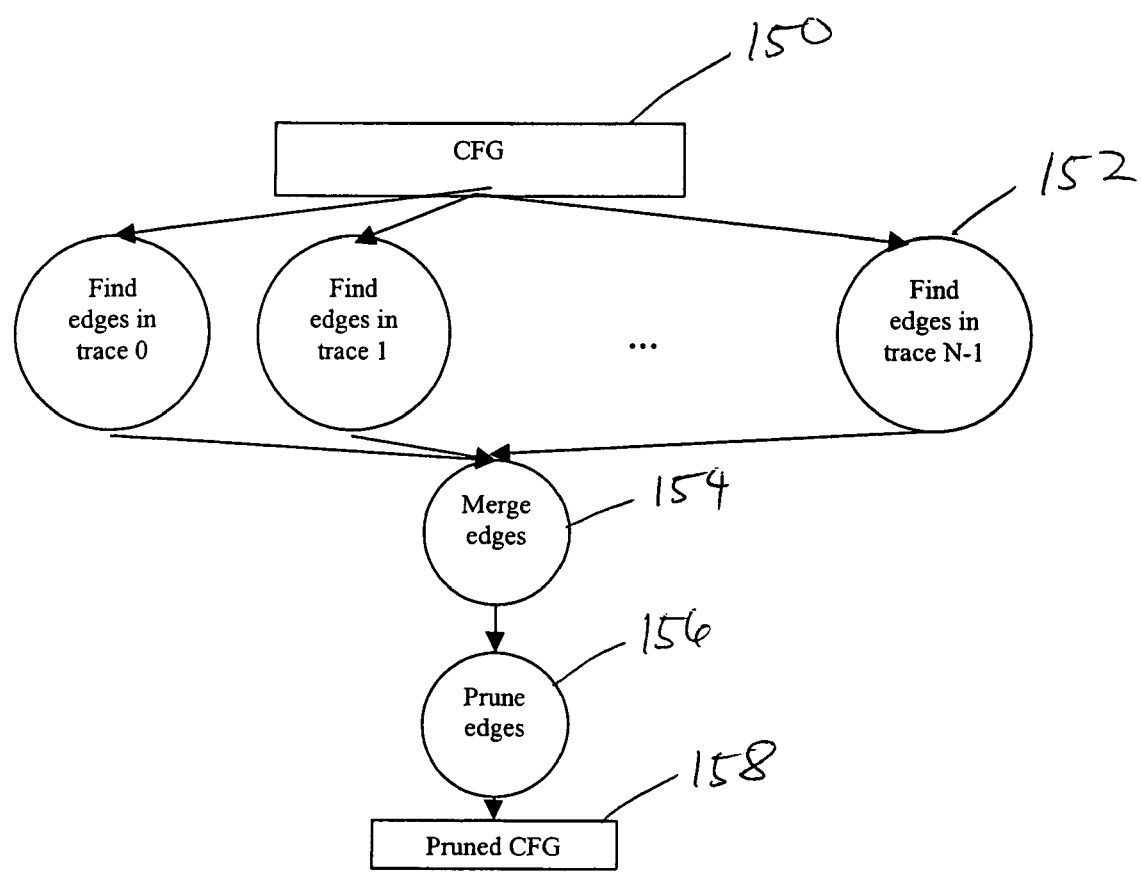
Figure 14:
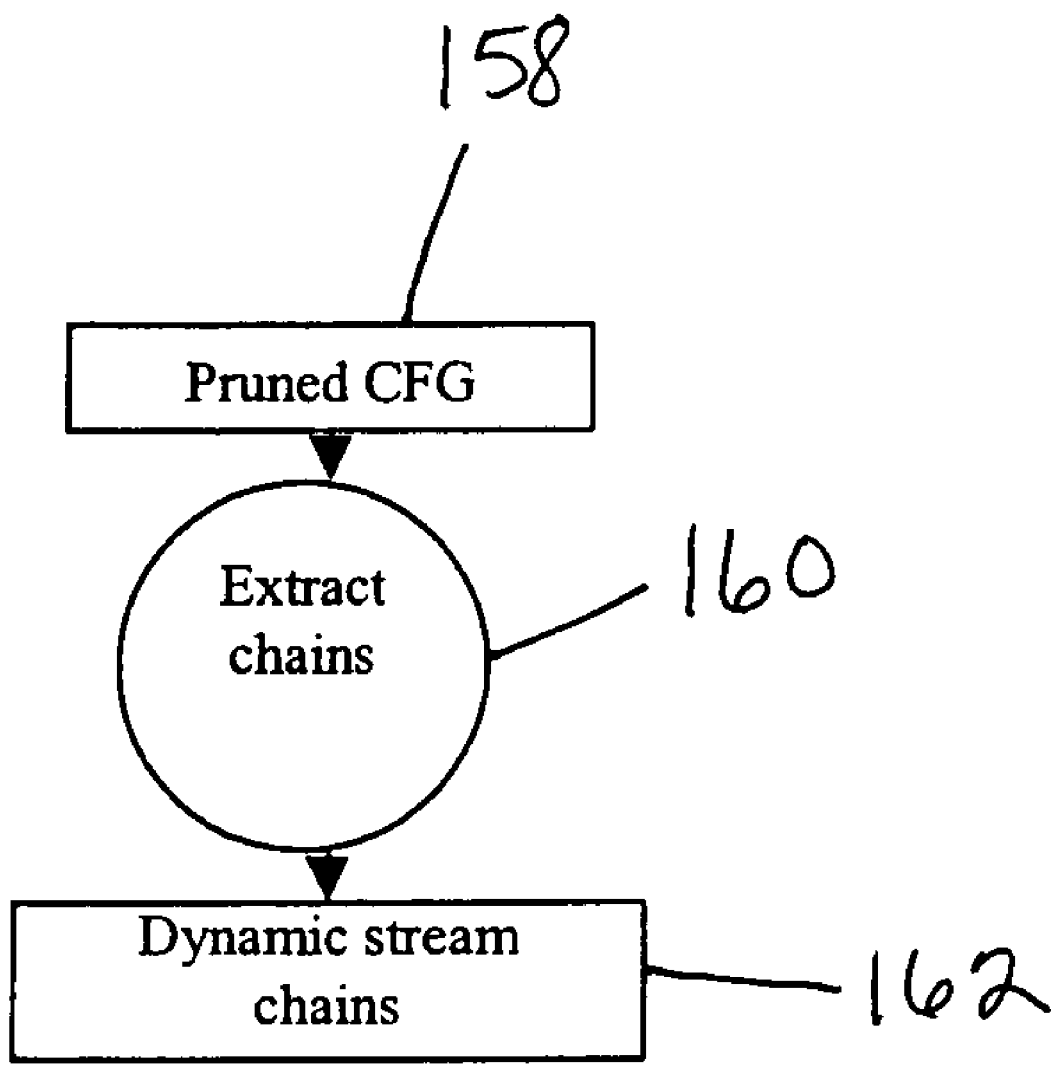

Once the hot streams and their children have been identified, a second scan of the execution trace is performed in order to construct a control flow graph (CFG) of program execution using only the hot and high confidence streams as nodes. All other streams are lumped together into a common sink. Low confidence edges and their associated nodes are pruned from the CFG based on a pruning criterion. In one embodiment, the pruning criterion is a frequency percentage defined as the execution frequency of an edge divided by the sum over all other out-edges from the same source node. The frequency percentage defines a strict percentage cut-off such that all edges below a percentage threshold and all edges leading to the common sink are removed. In one embodiment, second pruning criterion examines the variance in frequency percentage across all the edges. The variance is the difference between each edge and the edge with the maximum frequency percentage. A given threshold is set for the cases with one and two edges and scaled down linearly if there are more edges. Edges falling above the threshold or leading to or from the common sink are discarded. This process of constructing the control flow graph is illustrated with reference to FIG. 13 of the drawings. Referring to FIG. 13, a CFG 150 of program execution that is constructed such that each node in the CFG is a hot or high confidence stream is scanned at 152 to identify edges that satisfy the pruning criterion. The scan at 152 is performed for each local trace and the results are merged at 154. Thereafter at 156 edges that do not satisfy pruning criterion are removed and the result is a pruned CFG 158.

In one embodiment, the pruned CFG 158 is scanned in order to extract (see block 160 in FIG. 4) chains of dynamic streams 162 that are frequently executed. For example, in one embodiment, starting at the root of the CFG, the highest percentage edges are followed to the leaves, while taking care not to traverse a loop more than once. Naturally, other criteria may be used to extract chains from the pruned CFG 158. It is also possible to enumerate all possible chains with no pruning. The pruned CFG 158 represents a series of dynamic streams that an optimizer can use to perform optimizations such as encoding the dynamic blocks as mesocode.

Figure 15:
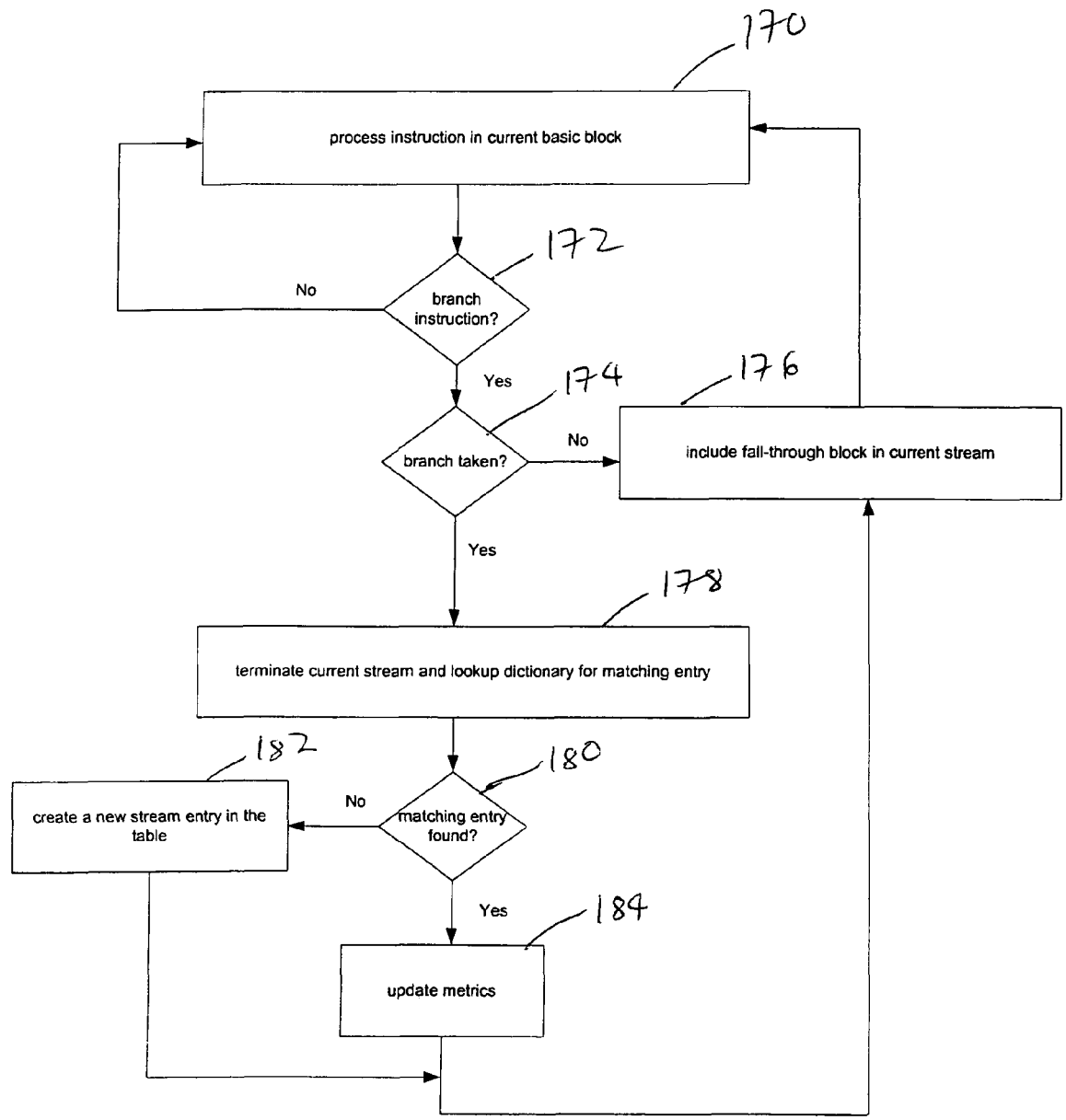
Figure 16:
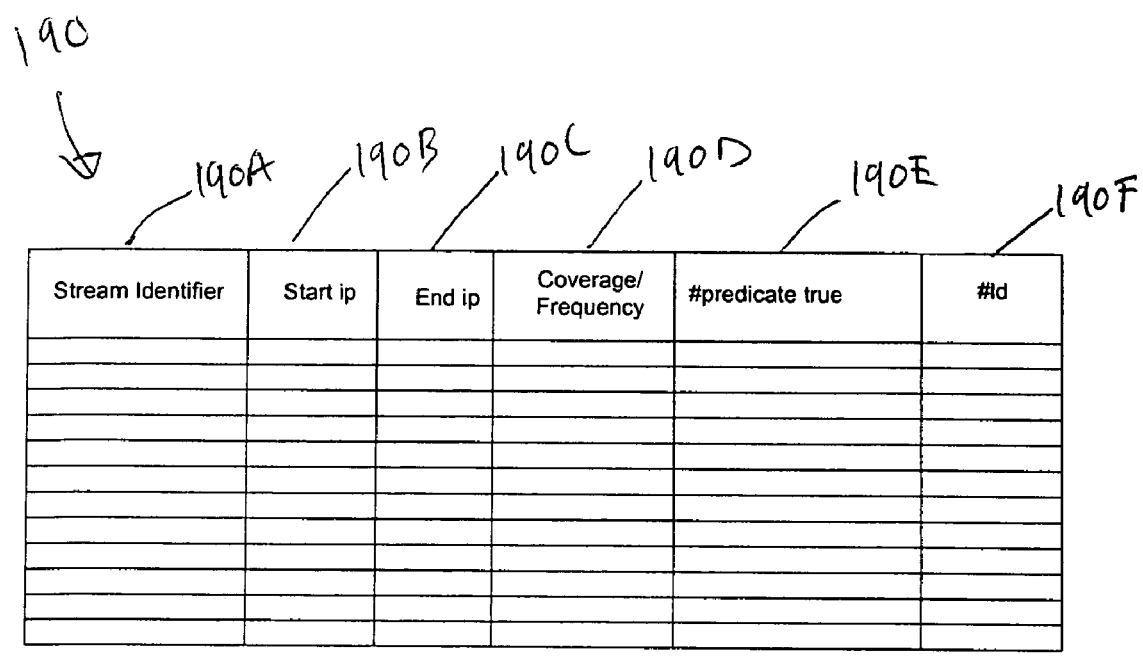
FIG. 16 shows one embodiment of a stream dictionary.

In one embodiment, the techniques for characterizing a program in terms of streams of basic blocks may be implemented in software. FIGS. 15–20 of the drawings illustrate one embodiment of how the techniques may be implemented in software. Referring to FIG. 15, at block 170, an instruction within a current basic block is processed. At block 172, the software determines if the current instruction is a branch instruction. If the current instruction is not a branch instruction then block 170 executes again, otherwise at block 174, the software determines if the branch is taken or not taken. If the branch is not taken then block 174 executes. At block 172, the fall-through block which starts at the instruction pointer of a not taken branch is included as a fall-through block of the current stream. If at block 174 it is determined that the branch is taken, then at 178 the software terminates a current stream and performs a look-up in a stream dictionary for a matching entry. In one embodiment, the stream dictionary may be implemented as a table 190 (see FIG. 16). The table 190 includes a stream identifier column 190A, a start instruction pointer (ip) column 190B, and an end instruction pointer (ip) column 190C. The table 190 also includes a number of metrics for each identified stream. For example, metrics may include a count of a defined number of instruction types occurring within a stream, as well as a coverage/frequency count for each stream. The metrics collected for each stream are entered in columns 190D, 190E, and 190F, in table 190. Further, when a current stream is terminated at block 178, the branch target ip is used as the ip for the next stream, and the ip of the branch taken instruction is used as the end ip for the current stream. At block 180, if there is no matching entry in the stream dictionary 190, then block 182 executes wherein the software creates a new stream entry in the dictionary 190. If, however at block 180, a match is found in the stream dictionary 190, then at block 184 the metrics for the matching stream are updated.

Figure 17:
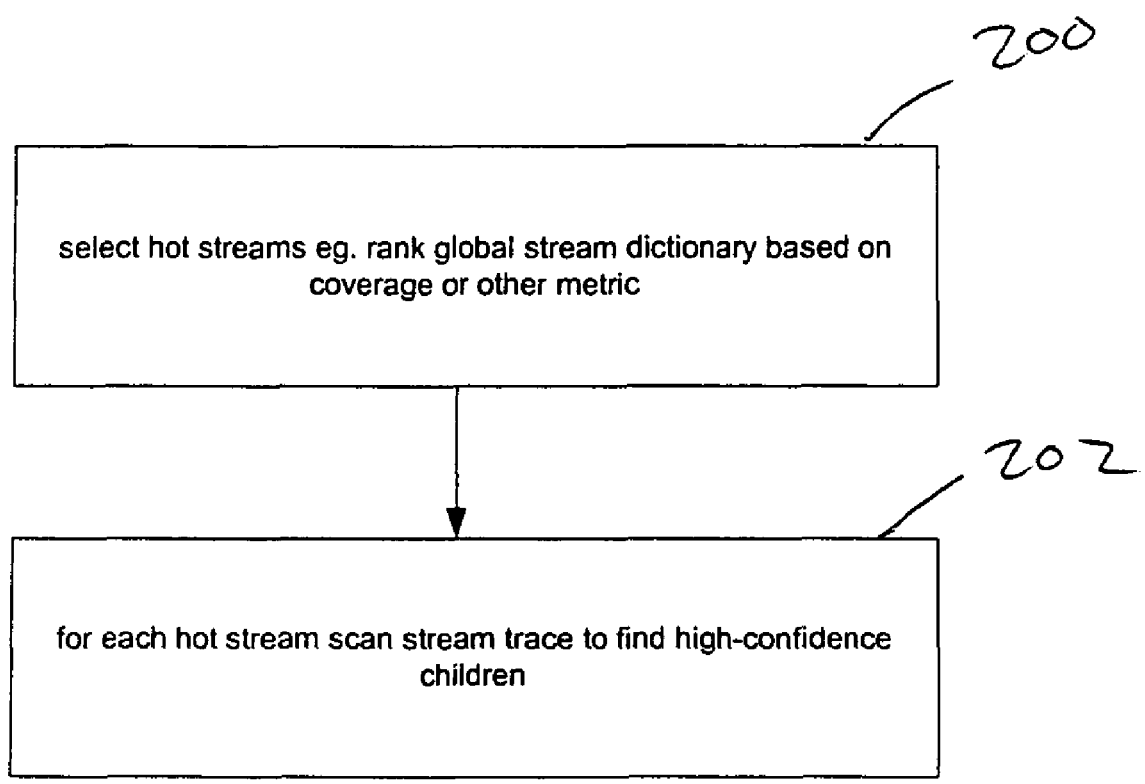
Figure 18:
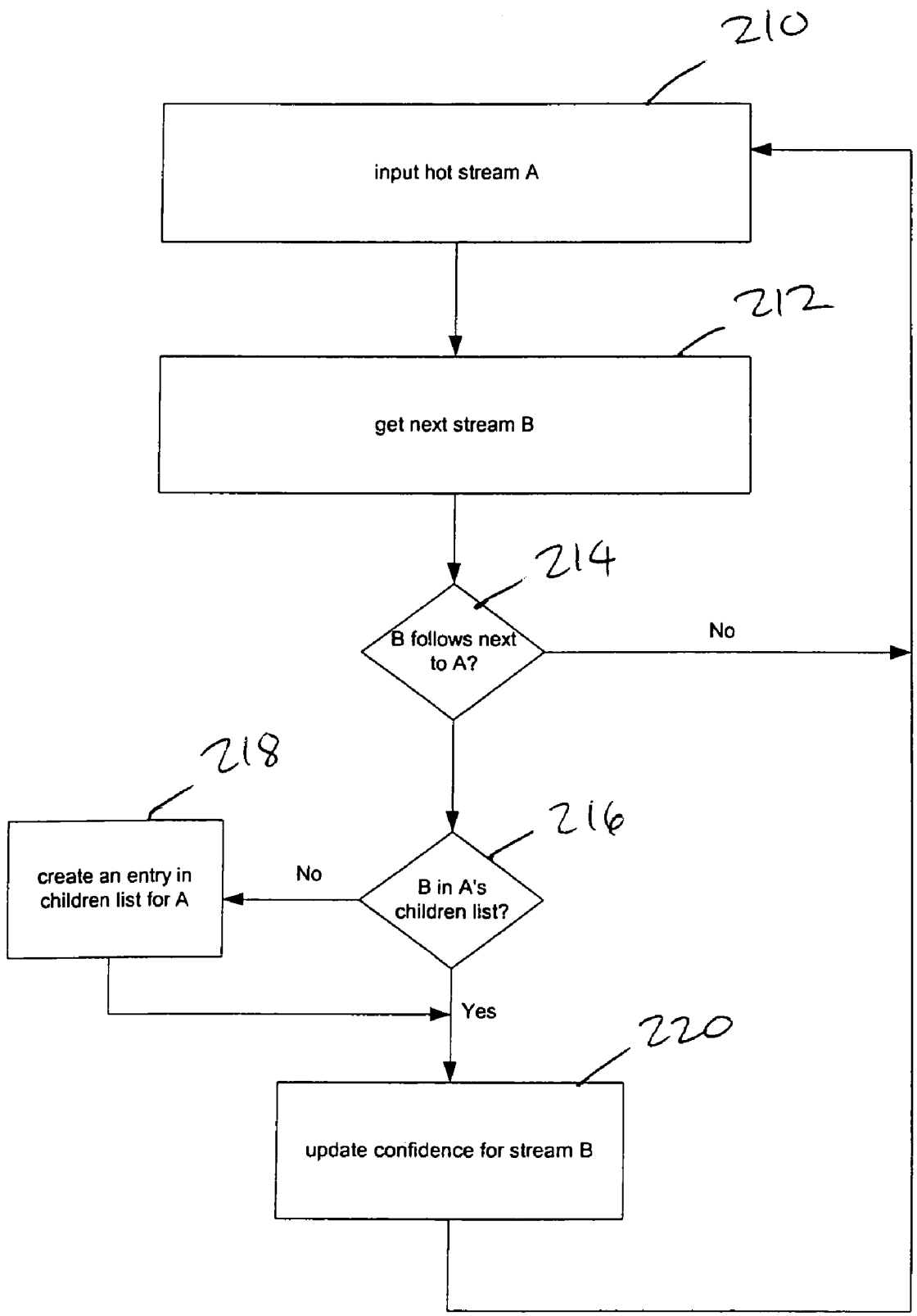

The operations shown in FIG. 17 of the drawings are performed once the stream dictionary 190 has been created. Referring to FIG. 17, at block 200 the software selects hot streams. This may be achieved by ranking the stream dictionary 190 based on coverage or some other metric. Thereafter, at block 202, the software scans the stream trace for each hot stream to find high confidence or hot children. The process of determining the high confidence/hot children is illustrated in FIG. 18 of the drawings. Referring to FIG. 18, at block 210, the software takes as input, a hot stream A. At 212, the software picks the next stream B. At 214, the software determines if the stream B follows immediately after the stream A. If stream B does not follow immediately after stream A, then block 210 executes again, otherwise the software checks at 216 if stream B occurs in stream A's children's list. If stream B does not occur in stream A's children's list, then an entry for stream B is created in the children's list for stream A, at 218. If stream B exists in the children's list for stream A, then block 220 executes, wherein the confidence for stream B is updated.

Figure 19:
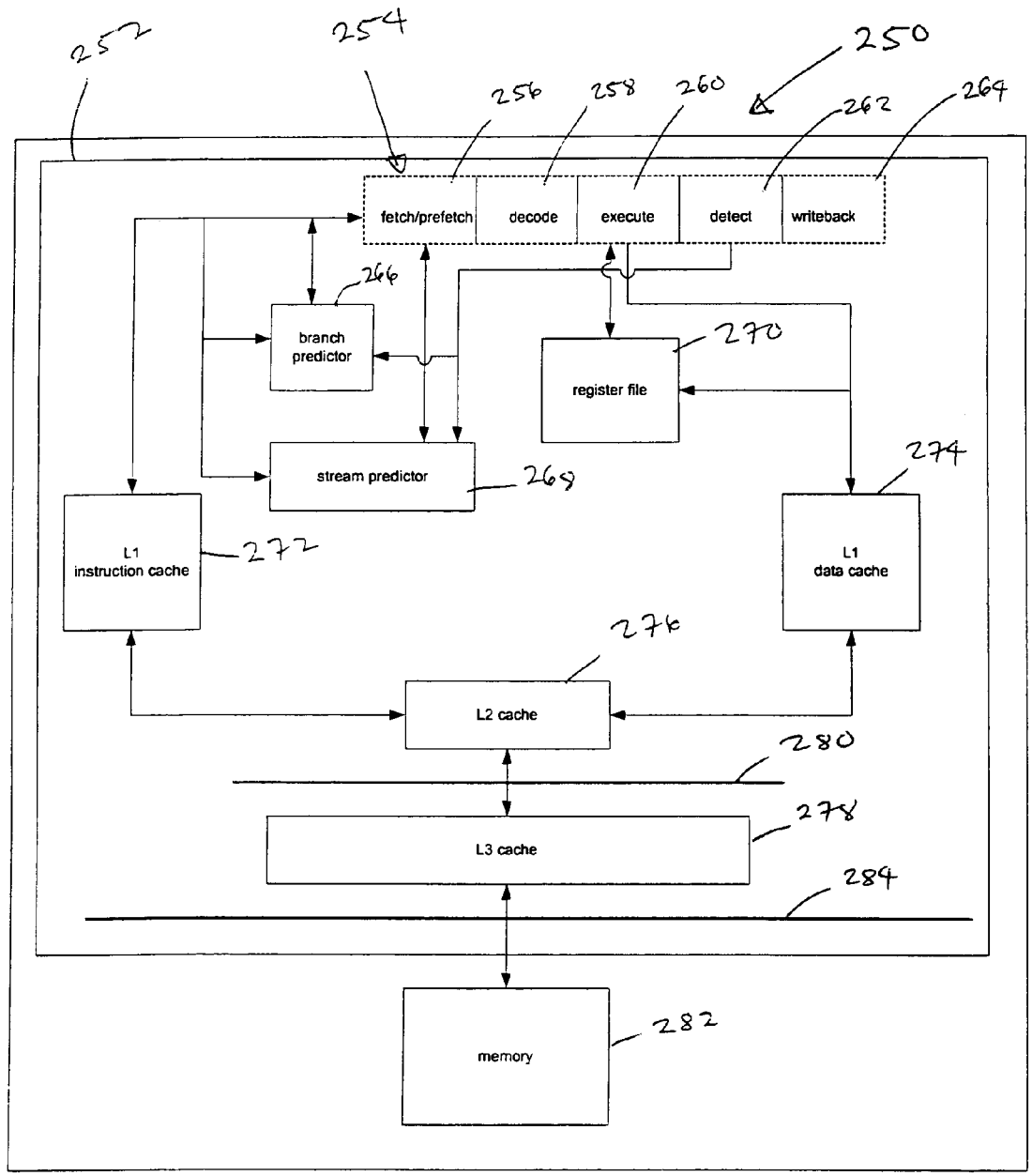
FIG. 19 shows one embodiment of hardware that may be used to identify basic blocks for mesocode encoding.

The characterization of a program in terms of streams as described above may also be performed in hardware. Thus, embodiments of the invention include hardware structures within a processor to identify streams of basic blocks during program execution. FIG. 19 of the drawings shows one embodiment of a system 250 that includes a hardware structure in a form of a stream predictor 268 which is capable of identifying a stream during program execution. A processor 252 includes a pipeline 254 which is illustrated in dotted lines. The stages of the pipeline 254 include a fetch/prefetch stage 256, a decode stage 258, an execute stage 260, a check/error detect stage 262, and a write-back stage 264. Each stage executes in a single clock cycle. The processor 252 includes a branch predictor 266 which includes dynamic branch prediction logic for predicting whether a branch will be taken or not. In use, the fetch/prefetch stage 256 submits the address of a branch instruction to the branch predictor 266 for a look-up and, if a hit results, a prediction is made on whether or not the branch will be taken when the branch instruction is finally executed in the execution stage 260. The branch predictor 266 only makes predictions on branches for which a history has been collected. Based on the prediction, the branch prediction logic takes one of two actions. Firstly, if a branch is predicted taken, the instructions that were fetched from memory locations along the fall through path of execution are flushed from the block of code which is currently in the fetch/prefetch stage 256. The branch prediction logic of the branch predictor 266 provides a branch target address to the fetch/prefetch stage 256 which then prefetches instructions along the predicted path. Alternatively, if a branch is predicted as not taken, the branch prediction logic of the branch predictor 254 does not flush instructions that come after the branch in the code block currently in the fetch/prefetch stage 256. Thus, the prefetch stage continues fetching code along the fall through path.

The processor 252 further includes a stream predictor 268 whose function will be explained in greater detail below. As can be seen, the processor 252 includes a register file 270 and during execution of an instruction in the execution stage 260 values are written and read from register file 270. As discussed above, the check/error detect stage 262 detects whether the correct instruction was executed in the execute stage 260, and only if the correct instruction was executed is the processor state allowed to change in the write-back stage 264.

The processor 252 further includes a cache memory hierarchy comprising a level one instruction cache 272, a level one data cache 274, a level two cache 276, and a level three cache 278. The level two cache 276 is connected to the level three cache 278 via a cache bus 280. The system 250 also includes a memory 282 which is connected via a system bus 284 to the processor 252.

Based on information received from the error detect stage 262, the stream predictor 268 constructs a stream dictionary, such as the stream dictionary 300 illustrated in FIG. 20 of the drawings. Referring to FIG. 20, it will be seen that the stream dictionary 300 comprises a start instruction pointer (ip) and an end ip which define the starting and ending point of a stream, respectively. Additionally, the stream dictionary 300 contains the ip for the next stream that is most likely to be executed based on an analysis of program behavior. Thus, the stream dictionary 300 not only identifies the stream, but also provides the next stream that is most likely to be executed for a given stream in the stream dictionary 300. FIG. 21 shows a more sophisticated version 302 of the stream dictionary 300. The only difference is that the stream dictionary 302 instead of having only a single next stream, has several next streams that are identified as being likely to follow any given stream in the dictionary.

Figure 22:
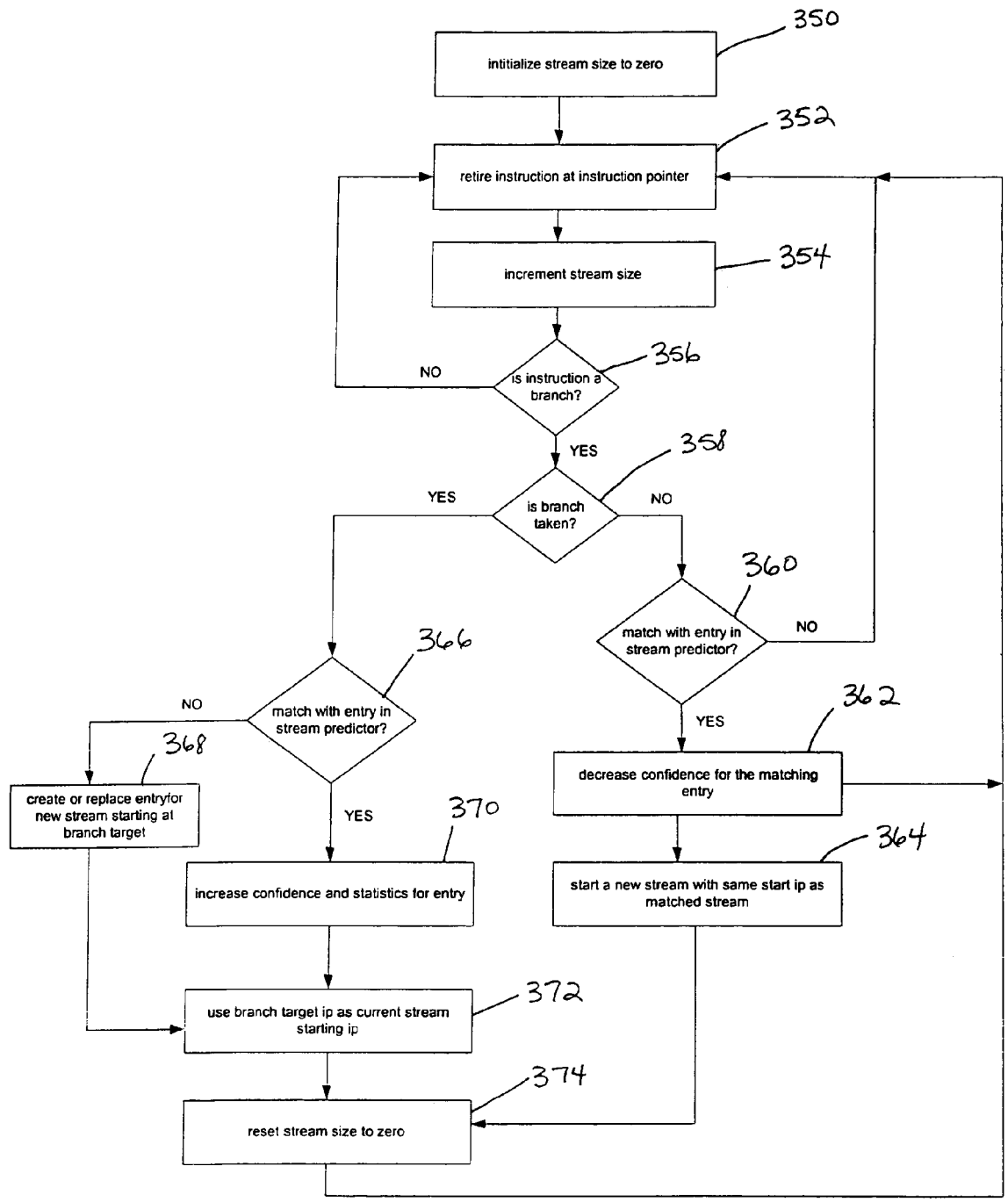
FIGS. 22, 24–25 show flow diagrams of operations performed by the hardware of FIG. 19.

In order to create the stream dictionaries 300, 302, the stream predictor 268 performs the operations shown in the flow chart of FIG. 22. Referring to FIG. 22, at block 350, a variable called stream size is initialized to zero. At block 352, a current instruction in the write-back stage 264 is retired. At block 354, the stream size is incremented by one. At block 356, a determination is made as to whether or not the retired instruction is a branch instruction that causes program flow to branch between a branch taken path and a branch not taken path. If the retired instruction is not a branch instruction then block 352 executes again, otherwise, block 358 executes. At block 358, a determination is made as to whether the branch instruction caused program flow to branch to the branch taken path. If, at block 358, it is determined that the branch instruction causes the branch not to be taken, then at block 360 an attempt is made to match the ip of the retired instruction with an entry in the stream predictor table 300, 302. If there is no match, then program flow branches to block 352. If the ip of the branch taken instruction matches an entry in the stream predictor table, then block 362 executes, wherein a confidence for the matched entry is decreased. Thereafter, block 364 executes, wherein an entry is created with the same start ip as that of the matched stream. If, at block 358, it is determined that the branch was taken, then at block 366 a further determination is made as to whether the current ip of retired instruction matches an entry in the stream predictor table. If there is a match, then at block 370, the confidence for that entry is increased. At block 372, the branch target ip of the taken branch is used as a starting ip for a current stream. If at block 366, there is no match with an entry in the stream predictor table, then block 368 executes wherein a new stream starting with the branch target ip is created. Alternatively, an existing stream is simply replaced with a new stream starting at the ip of the branch target. After execution of block 372, block 374 executes wherein the stream size is reset to zero. As noted above, a result of the stream predictor 268 performing the operations shown in the flow chart of FIG. 22 is the creation of a stream dictionary as shown in FIGS. 20 and 21.

In order to use the stream dictionary to predict which streams are likely to be taken, there has to be a confidence associated with the ip for each next stream. The higher the confidence, the more likely the next stream is to be taken. This confidence information may be integrated into the stream dictionary. Alternatively, a separate stream predictor table may be created, such as the table 400 shown in FIG. 23 which identifies each stream by starting ip, and ending ip. For each stream in table 400 there is provided one or more target streams each identified by a start ip and an end ip. Further, a confidence indicating a probability of the predicted or target stream being taken is provided. As will be seen, the stream predictor table 400 also includes a stream/normal column which provides information on whether the processor is operating in stream mode or normal mode as will be described below.

Figure 24:
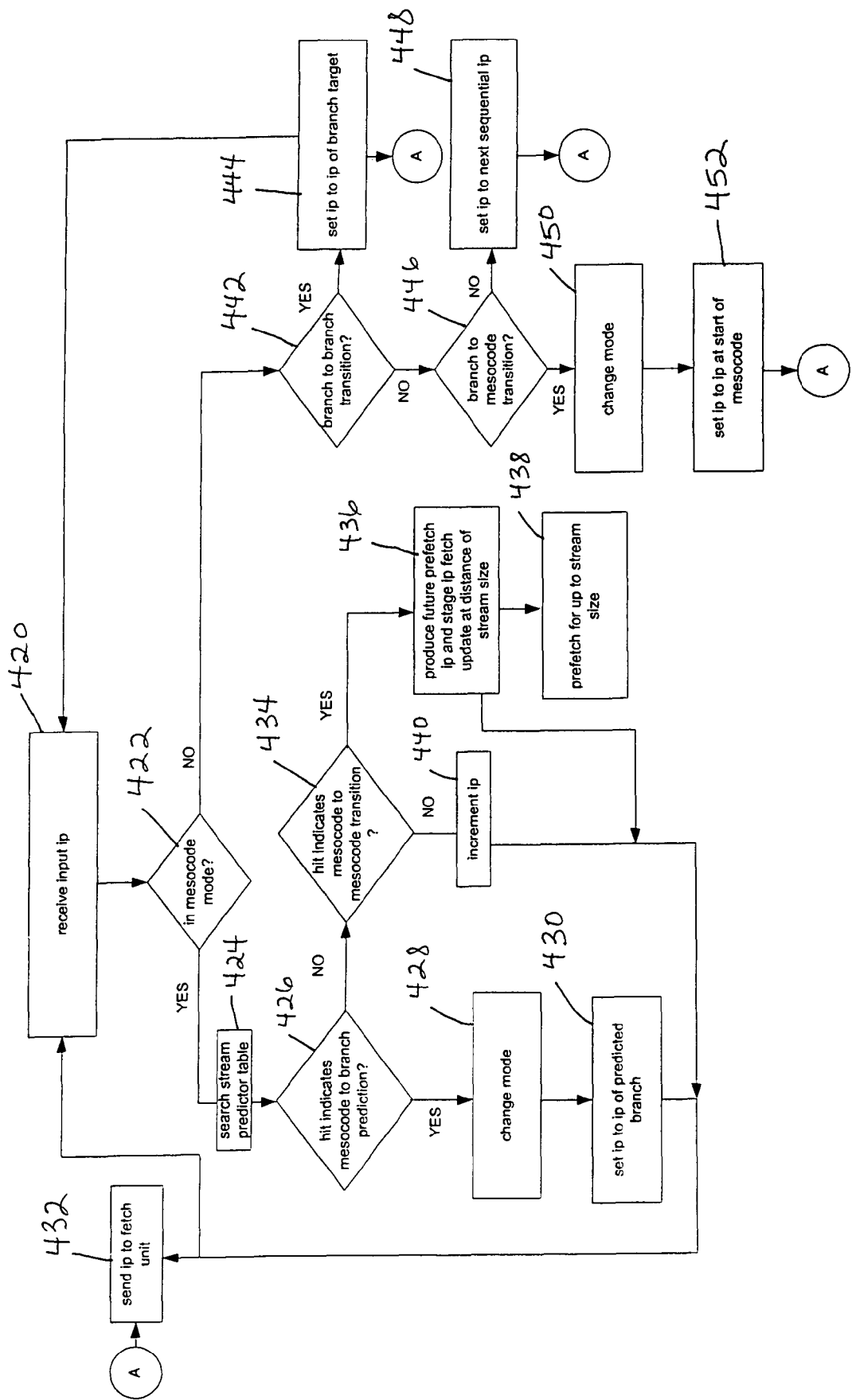

In use, the fetch/prefetch stage 256, submits the address of a branch instruction to the stream predictor 268 as well as to the branch predictor 266 for a look-up. This stream predictor 268 uses the input ip to predict the ip of a stream as is shown in the flow chart of FIG. 23. Referring to FIG. 24, at block 420, the stream predictor 268 receives an input ip from the fetch/prefetch stage 256. At block 422, the stream predictor 268 determines if the processor is operating in stream mode or in normal mode. If it is determined that the processor is operating in stream mode, then at block 424, the stream predictor table 400 is searched using the input ip as a key. At block 426, if the search produces a hit that indicates a stream to branch prediction, then the mode of the processor is changed to normal mode at block 428. Thereafter, at block 430, the ip is set to the ip of the predicted branch, and block 432 executes wherein the ip is sent to the fetch/prefetch unit 226. If at block 434, a hit in the stream predictor table 400 indicates a stream to stream transition, then block 436 executes, wherein a future prefetch ip is produced and staged so that fetching at the prefetch ip occurs at the distance of the stream size. At block 438, prefetching of instructions is performed starting at the prefetch ip for up to the stream size. If there is no hit in the stream predictor table 400, then block 440 executes, wherein the ip is simply incremented and control is transferred to block 432. If at block 422, it is determined that the processor is operating in normal mode, then block 442 executes. At block 442, the stream predictor 268 checks if the input ip corresponds to a branch to branch transition as indicated in the table 400. If the input ip corresponds to a branch to branch transition, then at block 444, the instruction pointer is set to the ip of the branch target, whereafter control passes to block 432. If, however, the stream predictor 268 determines, at block 440, that the input ip does not correspond to a branch to branch transition, then block 446 executes. At block 446, the stream predictor 268 determines if the input ip corresponds to a branch to stream transition. If it is determined that the input ip does not correspond to a branch to stream transition then block 448 executes wherein the ip is set to the next sequential ip and control is passed to block 432. If, however, it is determined at block 446, that the input ip corresponds to a branch to stream transition, then block 450 executes, wherein the mode of the processor is changed to operate in stream mode. Thereafter, block 452 executes, wherein the ip is set to the ip of the start of the stream and control is passed to block 432.

Thus, the operations performed by the stream predictor 268 as per the flow chart of FIG. 24 causes the stream predictor 268 to supply the ip of the next hot stream and its children to the fetch/prefetch stage 256.

Figure 25:
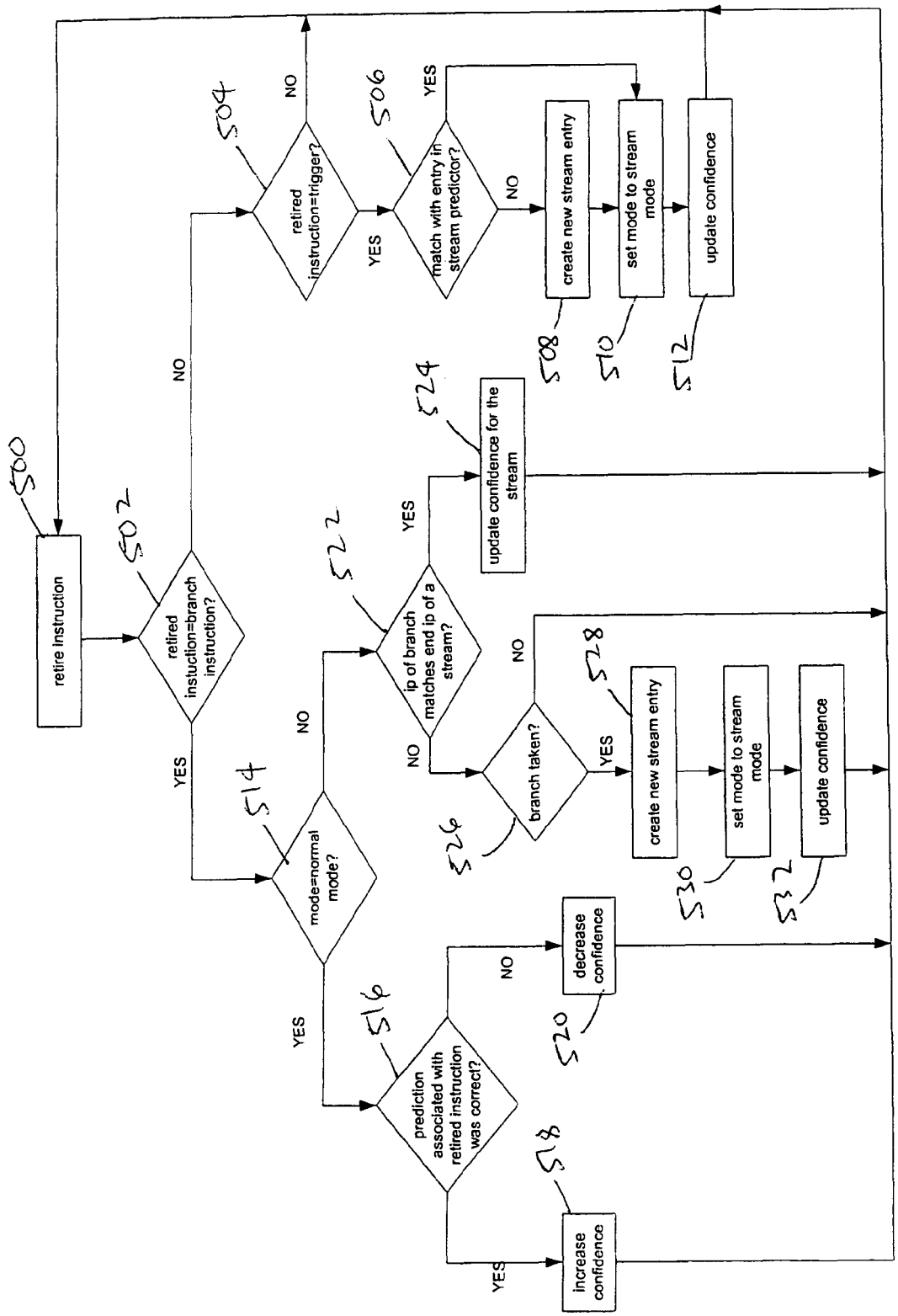

In order to maintain the accuracy of the prediction, after the write-back stage 264, the stream prediction table 400 needs to be updated based on information about what instructions were actually executed. FIG. 25 shows a flow chart of operations performed in order to operate the stream predictor table 400.

Referring to FIG. 25, at block 500, the current instruction at the write-back stage 264 is retired. At block 502, the stream predictor 268 determines if the retired instruction is a branch instruction. If the retired instruction is not a branch instruction, then block 504 executes, wherein the stream predictor 268 determines if the retired instruction is a trigger. If the retired instruction is not a trigger, then control passes to block 500. If the retired instruction is a trigger, then at block 506 the stream predictor table 400 is searched using the ip of the trigger as a key for a matching entry. If there is no matching entry, then at block 508, a new stream entry is created, and block 510 executes, wherein the processor is set to operate in stream mode. If at block 506, there is a matching entry in the stream predictor table 400, then control passes directly to block 510. After execution of block 510, block 512 executes wherein the confidence of a matched stream is updated.

If at block 502, it is determined that retired instruction is a branch instruction, then at block 514, the stream predictor 268 determines if the processor is operating in normal mode. If the processor is operating in normal mode, then at block 516, the prediction associated with the retired instruction is checked. If the prediction is correct, then at block 518 the confidence for that prediction is increased, otherwise, at block 520 the confidence for that prediction is decreased. If at block 514, it is determined that the processor is operating in stream mode, then at block 512, the stream predictor table 400 is searched to determine if the ip of the branch matches an end ip of a stream. If there is a match, then at block 524, the confidence for the matched stream is updated. Otherwise, at block 526, a determination is made as to whether the branch was taken or not. If the branch was taken, then a new stream entry is created at block 528. At block 530, the mode of the processor is set to stream mode and at block 532 the confidence for the new stream is updated.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
    analyzing a dynamic execution trace for a program;
    defining at least one stream comprising a sequence of basic blocks in the dynamic execution trace, wherein only a last block in the sequence ends in a branch instruction, the execution of which causes program flow to branch and end the at least one stream on a taken branch, the remaining basic blocks in each stream each ending in a branch instruction, the execution of which does not cause program flow to branch;
    collecting metrics associated with the at least one stream; and
    optimizing the at least one stream based on the metrics.

2. The method of claim 1, wherein the optimizing comprises encoding the at least one stream as mesocode.

3. The method of claim 2, wherein the mesocode comprises microinstructions that are ISA-implementation specific.

4. The method of claim 2, wherein the optimizing comprises including a temporal hint within a basic block of the at least one stream which when executed causes a subsequent block to be prefetched for execution.

5. The method of claim 4, wherein the subsequent block is a block within the at least one stream.

6. The method of claim 4, wherein in the case of multiple streams being identified, the subsequent block is a block from another stream.

7. The method of claim 1, wherein the metrics are selected from the group consisting of a number of instructions within the at least one stream, a number of instructions of each type within the at least one stream, values for particular operands, a coverage for each stream, and a frequency of execution for the at least one stream.

8. The method of claim 7, further comprising in the case of multiple streams being identified, further comprising identifying streams that are spatially non-contiguous in the dynamic execution trace, but are temporally contiguous.

9. The method of claim 8, wherein the optimizing comprises encoding the temporally contiguous streams so that they are spatially contiguous in the mesocode.

10. A method, comprising:
    partitioning a dynamic execution trace for a program into local traces;
    analyzing each local trace for streams, each stream comprising a sequence of basic blocks that were sequentially executed, wherein only a last block in the sequence ends in a branch instruction, the execution of which causes program flow to branch and end the at least one stream on a taken branch, the remaining basic blocks in each stream each ending in a branch instruction, the execution of which does not cause program flow to branch;
    collecting metrics for each stream within a local trace;
    for each local trace assigning a locally unique identifier to each unique stream within the local trace, and updating the collected metrics for each unique stream; and
    merging stream information from each local stream including assigning a globally unique identifier to each stream that is globally unique across the local traces, and updating the collected metrics for each stream identified by a globally unique identifier.

11. The method of claim 10, wherein the metrics are selected from the group consisting of a number of instructions within each stream, values for particular operands, a coverage for each stream, a number for each type of instruction within the stream, and a frequency of execution for each stream.

12. The method of claim 11, further comprising ranking the globally unique streams in accordance with a ranking criterion based on the metrics.

13. The method of claim 12, further comprising selecting the globally unique streams that have a ranking above a threshold.

14. The method of claim 13, further comprising forming a control flow graph of program execution wherein each selected globally unique stream defines a node in the control flow graph and each edge between nodes is weighted in accordance with a frequency that the edge was traversed.

15. The method of claim 14, further comprising pruning edges of the control flow graph that fall below a defined execution frequency.

16. The method of claim 15, further comprising traversing the pruned control flow graph to extract at least one chain of streams by following the most frequently executed edges from a root of the control flow graph.

17. The method of claim 16, further comprising optimizing each chain of streams.

18. A computer-readable medium, having stored thereon a sequence of instructions which when executed by a computer, cause the computer to perform a method comprising:
    analyzing a dynamic execution trace for a program;
    defining at least one stream comprising a sequence of basic blocks in the dynamic execution trace, wherein only a last block in the sequence ends in a branch instruction, the execution of which causes program flow to branch and end the at least one stream on a taken branch, the remaining basic blocks in each stream each ending in a branch instruction, the execution of which does not cause program flow to branch;
    collecting metrics associated with the at least one stream; and
    optimizing the at least one stream based on the metrics.

19. The computer-readable medium of claim 18, wherein the optimizing comprises encoding the at least one stream as mesocode.

20. A computer-readable medium, having stored thereon a sequence of instructions which when executed by a computer cause the computer to perform a method comprising:
    partitioning a dynamic execution trace for a program into local traces;
    analyzing each local trace for streams, each stream comprising a sequence of basic blocks that were sequentially executed, wherein only a last block in the sequence ends in a branch instruction, the execution of which causes program flow to branch and end the at least one stream on a taken branch, the remaining basic blocks in each stream each ending in a branch instruction, the execution of which does not cause program flow to branch;
    collecting metrics for each stream within a local trace;
    for each local trace assigning a locally unique identifier to each unique stream within the local trace, and updating the collected metrics for each unique stream; and merging stream information from each local stream including assigning a globally unique identifier to each stream that is globally unique across the local traces, and updating the collected metrics for each stream identified by a globally unique identifier.

21. The computer-readable medium of claim 20, wherein the metrics are selected from the group consisting of a number of instructions within each stream, values for particular operands, a coverage for each stream, a number for each type of instruction within the stream, and a frequency of execution for each stream.

22. A system, comprising:
a processor; and
a memory coupled to the processor, the memory storing instructions which when executed by the processor, cause the processor to perform a method comprising:
analyzing a dynamic execution trace for a program;
defining at least one stream comprising a sequence of basic blocks in the dynamic execution trace, wherein only a last block in the sequence ends in a branch instruction, the execution of which causes program flow to branch and end the at least one stream on a taken branch, the remaining basic blocks in each stream each ending in a branch instruction, the execution of which does not cause program flow to branch;
collecting metrics associated with the at least one stream; and
optimizing the at least one stream based on the metrics.

23. The system of claim 22, wherein the optimizing comprises encoding the at least one stream as mesocode.

24. A system, comprising:
a processor; and
a memory coupled to the processor, the memory storing instructions which when executed by the processor, cause the processor to perform a method comprising:
partitioning a dynamic execution trace for a program into local traces;
analyzing each local trace for streams, each stream comprising a sequence of basic blocks that were sequentially executed, wherein only a last block in the sequence ends in a branch instruction, the execution of which causes program flow to branch and end the at least one stream on a taken branch, the remaining basic blocks in each stream each ending in a branch instruction, the execution of which does not cause program flow to branch;
collecting metrics for each stream within a local trace;
for each local trace assigning a locally unique identifier to each unique stream within the local trace, and updating the collected metrics for each unique stream; and
merging stream information from each local stream including assigning a globally unique identifier to each stream that is globally unique across the local traces, and updating the collected metrics for each stream identified by a globally unique identifier.

25. The system of claim 24, wherein the metrics are selected from the group consisting of a number of instructions within each stream, values for particular operands, a coverage for each stream, a number for each type of instruction within the stream, and a frequency of execution for each stream.

* * * * *